United States Patent
Summers et al.

(10) Patent No.: US 11,895,184 B2
(45) Date of Patent: *Feb. 6, 2024

(54) PEER TO PEER REMOTE APPLICATION DISCOVERY

(71) Applicant: Citrix Systems, Inc., Fort Lauderdale, FL (US)

(72) Inventors: Jacob Summers, Coral Springs, FL (US); Rakesh Kumar, Pompano Beach, FL (US); Julian Petrov, Pembroke Pines, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/693,591

(22) Filed: Mar. 14, 2022

(65) Prior Publication Data

US 2022/0210223 A1 Jun. 30, 2022

Related U.S. Application Data

(63) Continuation of application No. 14/324,580, filed on Jul. 7, 2014, now Pat. No. 11,310,312.

(51) Int. Cl.
*H04L 67/025* (2022.01)
*H04L 67/1061* (2022.01)
(Continued)

(52) U.S. Cl.
CPC ........ *H04L 67/1072* (2013.01); *G06F 9/5055* (2013.01); *G06F 9/54* (2013.01);
(Continued)

(58) Field of Classification Search
CPC ............... H04L 67/1072; H04L 67/025; H04L 67/1068; G06F 9/5055; G06F 9/54; G06F 9/542
(Continued)

(56) References Cited

U.S. PATENT DOCUMENTS 5,729,682 A 3/1998 Marquis et al.
5,999,530 A 12/1999 LeMaire et al.
(Continued)

FOREIGN PATENT DOCUMENTS

EP 0993163 A1 4/2000
EP 1022876 A1 7/2000
(Continued)

OTHER PUBLICATIONS

The International Search Report and Written Opinion of The International Searching Authority dated Feb. 26, 2015 corresponding to International Application No. PCT/US2014/050221.
(Continued)

*Primary Examiner* — Suraj M Joshi
*Assistant Examiner* — Sherman Lin

(57) ABSTRACT

Methods, systems, and computer-readable media for peer to peer discovery of remote applications are presented. A client device may discover available remote peers and remotely access applications hosted thereon. The client device may send a discovery message over a network and locate one or more peer devices with available remote access. The peer device may respond with a list including applications installed and currently executing application instances that the client device may remotely access. The peer device may dynamically generate the list based on analyzing applications installed on the peer device and application instances executing on the peer device. The client device may initiate remote access of a selected application hosted on the peer device. The peer device may execute the selected application in a remote mode by hooking input and output interfaces associated with the application, and the application may be executed in a shadow desktop environment. These and other features will be discussed further herein.

21 Claims, 10 Drawing Sheets

(51) Int. Cl.
    *G06F 9/50* (2006.01)
    *G06F 9/54* (2006.01)
(52) U.S. Cl.
    CPC ............ *G06F 9/542* (2013.01); *H04L 67/025* (2013.01); *H04L 67/1068* (2013.01)
(58) Field of Classification Search
    USPC .......................................................... 709/203
    See application file for complete search history.

(56) References Cited

U.S. PATENT DOCUMENTS

| | | | |
|---|---|---|---|
| 6,222,529 | B1 | 4/2001 | Ouatu-Lascar et al. |
| 6,738,817 | B1 | 5/2004 | Chen et al. |
| 8,370,431 | B1 * | 2/2013 | Wang ...................... H04L 63/10 709/204 |
| 8,539,488 | B1 * | 9/2013 | Havemose ............... G06F 9/547 718/100 |
| 2003/0156132 | A1 | 8/2003 | Gn et al. |
| 2003/0189601 | A1 | 10/2003 | Ben-Shachar et al. |
| 2004/0024890 | A1 | 2/2004 | Baek et al. |
| 2004/0064702 | A1 | 4/2004 | Yu et al. |
| 2005/0080906 | A1 | 4/2005 | Pedersen |
| 2005/0120073 | A1 | 6/2005 | Cho |
| 2005/0138242 | A1 | 6/2005 | Pope et al. |
| 2006/0245268 | A1 | 11/2006 | Fritz |
| 2006/0271877 | A1 | 11/2006 | Theurer |
| 2007/0174410 | A1 | 7/2007 | Croft et al. |
| 2008/0040272 | A1 * | 2/2008 | Eskin .................... H04L 12/282 705/41 |
| 2009/0195537 | A1 | 8/2009 | Qiu et al. |
| 2009/0222739 | A1 | 9/2009 | Schmieder et al. |
| 2010/0013839 | A1 | 1/2010 | Rawson |
| 2010/0325284 | A1 | 12/2010 | Heim et al. |
| 2011/0134111 | A1 | 6/2011 | Stone |
| 2011/0137991 | A1 | 6/2011 | Russell |
| 2011/0185068 | A1 | 7/2011 | Schmieder et al. |
| 2012/0054640 | A1 * | 3/2012 | Nancke-Krogh ..... G06F 9/4843 715/751 |
| 2012/0059875 | A1 | 3/2012 | Clark |
| 2012/0069131 | A1 | 3/2012 | Abelow |
| 2012/0084713 | A1 | 4/2012 | Desai et al. |
| 2012/0092277 | A1 * | 4/2012 | Momchilov ............ G06F 3/041 345/173 |
| 2013/0007090 | A1 * | 1/2013 | Sankararaman .......... G06F 9/46 709/201 |
| 2013/0212288 | A1 | 8/2013 | Jakubowski |
| 2013/0290858 | A1 | 10/2013 | Beveridge |
| 2013/0346494 | A1 | 12/2013 | Nakfour et al. |
| 2014/0372506 | A1 | 12/2014 | Butner et al. |
| 2015/0012831 | A1 | 1/2015 | Boggess |

FOREIGN PATENT DOCUMENTS

| | | |
|---|---|---|
| EP | 1229443 A2 | 8/2002 |
| WO | 0039678 A1 | 7/2000 |
| WO | 2013046068 A1 | 4/2013 |
| WO | 2013056204 A1 | 4/2013 |

OTHER PUBLICATIONS

Feb. 26, 2016—U.S. Non-Final Office Action—U.S. Appl. No. 14/324,580.
International Search Report and Written Opinion of the International Searching Authority dated Mar. 3, 2015, corresponding to International Application No. PCT/US2014/050218, 68 pages.
Wikipedia, "Virtual Network Computing," 6 pages, revisions dated Jun. 17, 2014, accessed Feb. 13, 2015, retrieved from <http://en.wikipedia.org/w/index.php?ti>tle=Virtual_Network_Computing &oldid=613221122.
Mar. 11, 2016—U.S. Non-Final Office Action—U.S. Appl. No. 14/324,646.
Jul. 1, 2016—U.S. Final Office Action—U.S. Appl. No. 14/324,646.
Aug. 29, 2016—U.S. Final Office Action—U.S. Appl. No. 14/324,580.
Jan. 30, 2017—U.S. Non-final Office Action—U.S. Appl. No. 14/324,646.
Matthew, Windows Shadow command to interact/connect with a user Remote Desktop Session, Nov. 26, 2013, http://www.techiesweb.com/windowsshadowcommandtointeractconnectwithasuerremotedesktopsession/, accessed on Jan. 9, 2017.
Jun. 22, 2017—U.S. Non-final Office Action—U.S. Appl. No. 14/324,580.
Aug. 25, 2017—U.S. Final Office Action—U.S. Appl. No. 14/324,646.
Nov. 30, 2017—U.S. Final Office Action—U.S. Appl. No. 14/324,580.
Hobo (http://robinhobo.com/installing-configuring-citrix-xenapp-7-5/, Mar. 26, 2014, accessed on Nov. 23, 2017).
Sep. 21, 2018—U.S. Non-final Office Action—U.S. Appl. No. 14/324,646.
Sep. 28, 2018—U.S. Non-final Office Action—U.S. Appl. No. 14/324,580.
May 2, 2019—U.S. Final Office Action—U.S. Appl. No. 14/324,580.
Dec. 13, 2019—U.S. Non-final Office Action—U.S. Appl. No. 14/324,646.
Apr. 6, 2020—U.S. Final Office Action—U.S. Appl. No. 14/324,646.
Sep. 4, 2020—U.S. Final Office Action—U.S. Appl. No. 14/324,580.
Mar. 22, 2021—U.S. Non-final Office Action—U.S. Appl. No. 14/324,646.
Wikipedia, "Discovery and Launch", pp. 1-2, available at http://en.wikipedia.org/wiki/Discovery_And_Lanch, last accessed Jan. 23, 2014.
Oct. 4, 2021—U.S. Final Office Action—U.S. Appl. No. 14/324,646.
Nov. 23, 2021—U.S. Notice of Allowance—U.S. Appl. No. 14/324,580.
Mar. 7, 2022—U.S. Notice of Allowance—U.S. Appl. No. 14/324,580.

\* cited by examiner

PEER TO PEER REMOTE APPLICATION DISCOVERY

RELATED APPLICATION

This application is a continuation of U.S. patent application Ser. No. 14/324,580 entitled "Peer to Peer Remote Application Discovery," which is related to a commonly assigned patent application, U.S. patent application Ser. No. 14/324,646, filed concurrently herewith, entitled "Providing Remote Access to Applications Through Interface Hooks," the disclosure of which is hereby expressly incorporated by reference in its entirety.

FIELD

Aspects of the disclosure relate to computer hardware and software. In particular, one or more aspects of the disclosure generally relate to computer hardware and software for remote execution of applications on one or more devices.

BACKGROUND

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

Historically, servers may provide a client with remote access to a specific application. The client may initiate a connection with the server and view/control the application executing on the server. However, a user may be required to provide the identity of the server as well as identify the specific application to be remotely accessed. This may present problems when the user does not know the identity of the server or what applications are provided.

These servers may provide a client with remote access to a selected application by receiving user input from the client and playing the received user input back on a user session. The remote user input may be placed in an operating system input queue, and the user session may be configured such that the operating system input queue feeds into the selected application. Desktop output generated by the server may be forwarded to the remote client. This may present problems where multiple applications in a user session receive user input intended for other applications, and where output forwarded by the server may include some windows occluded by other windows.

SUMMARY

Aspects of the disclosure relate to various systems and techniques that provide more convenient, functional, and easy-to-use ways for users to remotely access software applications, particularly in instances in which a user seeks to access an application provided on a host computing device from a client computing device. Aspects discussed herein may accomplish this by providing communication between client and host devices without need for a dedicated remote server and remote client brokering infrastructure. In addition, certain aspects of the disclosure may provide particular advantages where a user desires to access an application instance already running on another computing device. Certain aspects of the disclosure may be useful where a user seeks to remotely access an application from a smart phone, tablet computer, or other type of touch-enabled mobile computing device.

Some aspects discussed herein may provide peer to peer discovery of remote applications. In some embodiments, a client device may discover available remote peers and remotely access applications hosted on a peer device. The client device may send a discovery message over a network and locate one or more peer devices with available remote access. This may provide for dynamic discovery of available peers without requiring a preconfigured host list or server interaction, according to some aspects. The peer device may respond with a list including applications installed and currently executing application instances that the client device may remotely access. This may provide for simplified identification of remote applications as remote applications may be automatically discovered and a user of the peer device need not manually specify applications that are available, according to some aspects. The client device may initiate remote access of a selected application hosted on the peer device. These and other features will be discussed further herein.

For example, and as will be described further below, a user who had been working on a document in a word processor at his desktop computer can later access that document as he had been working on it from another device, such as his mobile device. The mobile device may dynamically identify available peer devices, discover the desktop computer, receive a list of remotely available applications including the open instance of the word processor, and initiate remote access of the open instance of the word processor. Thus, according to some aspects disclosed herein, a user may be provided with ready access to his information and applications regardless of physical presence at a device storing that information and executing the applications, potentially providing a better user experience and improving access to information.

Other aspects discussed herein may provide remote access to applications hosted on a peer device by executing those applications in a shadow desktop. A remotely accessible instance of an application may be executed in a remote mode through use of hooks into one or more input and/or output interfaces associated with the remote instance of the application. By way of these hooks, output from the remote instance may be redirected to a remote user and input from the remote user may be transmitted to the remote instance. The remote instance may be executed in a shadow desktop of the peer device that is separate and/or segregated from other desktops provided by the peer device. A local user of the peer device may receive output from and provide input to applications executing in a local mode, but input and/or output interfaces associated with an application executing in a remote mode may be redirected to the client device.

Some aspects described herein may provide a method for providing remote access to hosted applications. The method may comprise receiving a discovery request from a client seeking available remote peers. The discovery request may be received by a peer device. The peer device may send a response indicating that remote access is available. The peer device may receive a request from the client for a list of available applications for remote access. The peer device may generate the list of available applications based on a listing of one or more applications installed on the peer device and one or more application instances executing on the peer device. The list of applications may be sent to the client by the peer device. In response to receiving a selection of one of the applications in the list of available applications, the peer device may provide the client with remote access to the selected application. The selected application may be an application installed on the peer device or an application instance executing on the peer device.

In some embodiments, the discovery request may be a broadcast message sent on a network shared by the peer device and the client device. The discovery request may contain authentication information related to the remote access request. The selected application may be executed in a background or shadow desktop environment of the peer device and may be segregated from other applications executing on the peer device. One or more input and/or output interfaces associated with the selected application or application instance may be hooked into or otherwise modified such that output from the application instance is redirected to the client and input from the client is redirected to the application instance.

The peer device may execute a first instance of an application in a local mode such that a local user of the peer device may operate the first instance. The first instance may be included on the list of applications sent to the client. The first instance may be selected for remote access, and the peer device may provide remote access to the first instance by transforming the first instance from the local mode to a remote mode.

Other aspects described herein may enable a host device to provide remote access to applications executing in a user session by hooking one or more application programming interfaces (APIs) (or other interfaces) associated with an application instance and a window composition module. Dynamically assigned ports may be generated and used to allow a client device to provide remote user input to an application instance operating in a remote access mode. One or more APIs associated with the application instance may be hooked to provide the remote user input to an input queue of the application instance, bypassing an operating system input queue in some embodiments. APIs associated with the application instance and the window composition module may be hooked to allow the host device to recognize window textures generated by the application instance. These recognized window textures may be sent to the remote client device.

Some aspects described herein may provide a method including initiating, by a host device, an instance of an application in a remote access mode. The instance of the application may be placed in the remote access mode by assigning a port to the instance of the application and hooking one or more APIs associated with the instance of the application. The host device may receive user input from a remote client through the assigned port. The host device may provide the received user input to the application instance using the hooked APIs. Output from the application instance operating in the remote access mode may be sent to the client device, and the output may include an application window associated with the application instance.

In some embodiments, the host device may notify the remote client of the port assigned to the application instance. The host device may maintain a mapping between the dynamically assigned port and the application instance. User input received via the port may be identified as intended for the application instance based on the mapping.

Other aspects described herein may provide a method including initiating, by a host device, an instance of an application in a remote access mode. The instance of the application may be initiated in the remote access mode by hooking one or more APIs associated with the instance of the application and one or more APIs associated with a window composition module. The host device may provide remote user input to the application instance. The host device may identify an application window associated with the instance of the application using the hooked APIs. The identified application window may be extracted as an image from the window composition module, and the extracted application window may be sent to a client device.

In some embodiments, identifying the application window may comprise marking the application window with an identifier using an API associated with the application instance and recognizing the identifier using an API associated with the window composition module. The image data associated with the application window may be extracted during a composition process of the window composition module.

Other aspects described herein may provide a method including initiating, by a host device, an instance of an application in a remote access mode. The host device may initiate the remote access mode by assigning a port to the instance of the application, hooking one or more input APIs associated with the instance of the application, hooking one or more output APIs associated with the instance of the application, and hooking one or more composition APIs associated with a window composition module. The host device may receive user input from a remote client through the assigned port, and the host device may provide the received user input to the application instance using the hooked input APIs. The host device may identify an application window associated with the instance of the application using a hooked API, such as the hooked output APIs. The host device may extract the application as an image from the window composition module. The extracted image may be send to the remote client as output associated with the application instance.

In some embodiments, the host device may notify the remote client of the port assigned to the instance of the application. The host device may store a mapping between the port and the instance of the application that identifies that input received on the port is intended for the application instance. The host device may mark the application window with an identifier using an API associated with the instance of the application, and the host device may recognize the application window based on the identifier during processing by the window composition module using an API associated with the window composition module.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
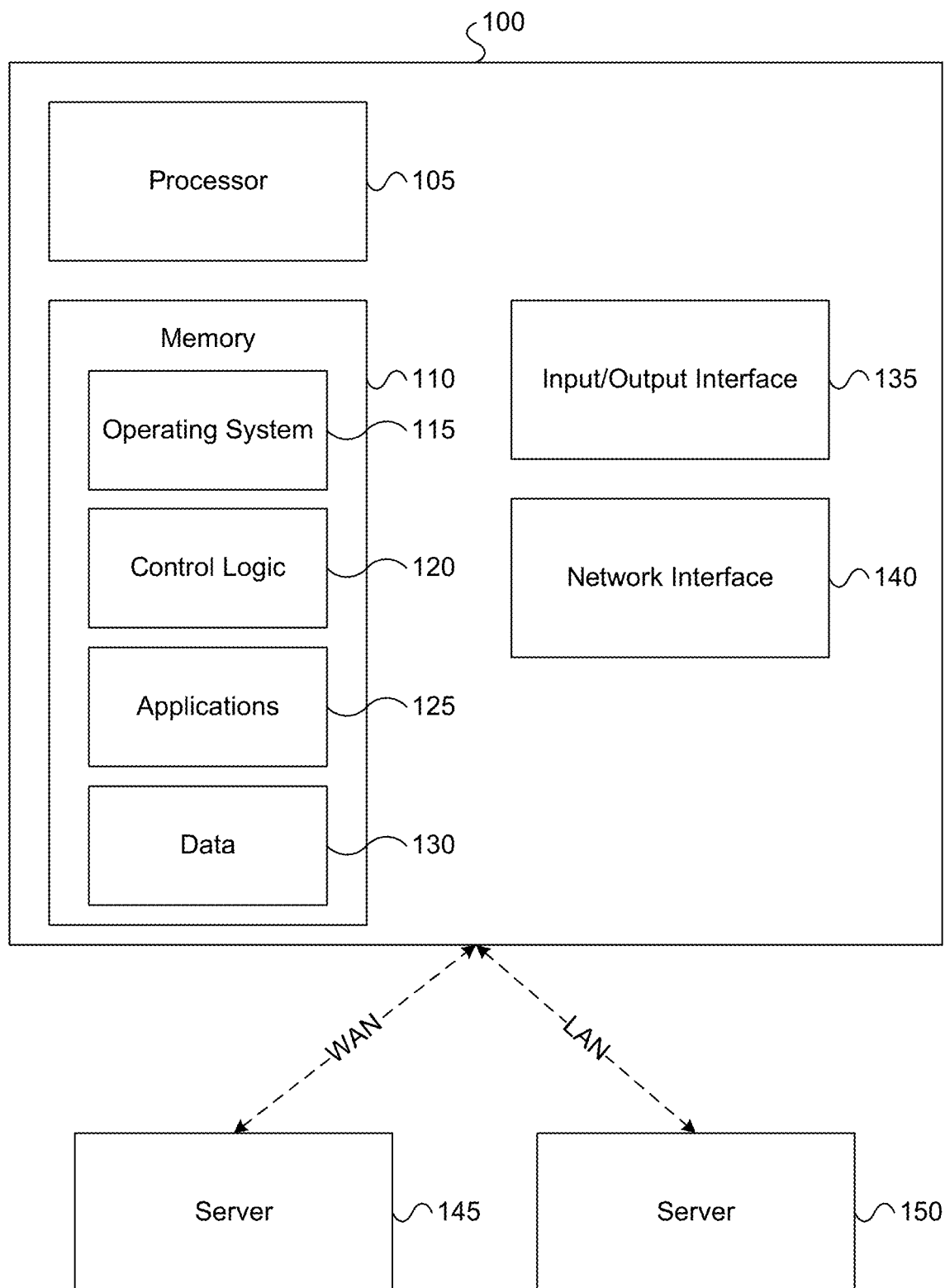
FIG. 1 depicts an example of a computing device that may be used in implementing one or more aspects of the disclosure in accordance with one or more illustrative aspects discussed herein.

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

According to some aspects discussed herein, a client device may discover available remote peers and remotely access applications hosted thereon. The client device may send a discovery message over a network and locate one or more peer devices that provide remote access. This may allow dynamic discovery of available peers without requiring a preconfigured host list, according to some aspects. The peer device may respond with a list of applications the client device may remotely access, including installed applications and currently executing application instances. This may provide for simplified identification of remote applications as remote applications may be automatically discovered and a user of the peer device need not manually specify applications that are available, according to some aspects. The client device may initiate remote access of a selected application hosted on the peer device. These and other features will be discussed further herein.

In some embodiments, a peer device may receive a broadcast request from a client device seeking available remote peers. The peer device may respond to the client device indicating that the peer device has available remote access and provide a host address of the peer device. The peer device may generate a list of available remote applications including locally executing application instances and installed application. The list may be generated based on a listing of locally executing application instances and/or a listing of applications installed on the peer device, and provide this list to the client device. A user of the client device may select one of the available application instances or installed applications for remote access, and the peer device may receive this selection from the client device. The peer device may provide the client device with remote access to the selected application, as described further herein.

As one specific example of a scenario in which one or more aspects illustrated herein may be practiced, the client device may be a tablet computer operated by a user, and the peer device may be a desktop computer available to the user. The user may have been previously working on the desktop computer, such as by opening a document in a word processing application on the desktop computer. The user may have made changes to the document or located an important piece of information in the document as presented in the instance of the word processing application executing on the desktop computer. The user may, for example, then proceed to a meeting and take the tablet computer to the meeting. The user may operate a remote application viewer installed on the tablet computer to select the desktop computer as a host, select the instance of the word processing application that the user previously interacted with, and access that instance remotely using the tablet computer. The tablet computer may present the user with the instance of the word processing application as he left it on the desktop computer. Methods and systems supporting one or more of these features are described in further detail below.

Other aspects described herein may enable a host device to provide remote access to applications executing in a user session by hooking one or more APIs (or other interfaces) associated with an application instance and a window composition module. Dynamically assigned ports may be generated and used to allow a client device to provide remote user input to an application instance operating in a remote access mode. One or more APIs associated with the application instance may be hooked to provide the remote user input to an input queue of the application instance, bypassing an operating system input queue in some embodiments. APIs associated with the application instance and the window composition module may be hooked to allow the host device to recognize window textures generated by the application instance. These recognized window textures may be sent to the remote client device. As a result, according to some aspects, a host device may enable remote access to the application instance by providing remote input to the application instance and forwarding output from the application instance to the remote client device. Methods and systems supporting one or more of these features are described in further detail below.

As noted above, certain embodiments are discussed herein that relate to providing peer to peer discovery of remote applications. Before discussing these concepts in greater detail, however, several examples of computing devices and system architectures that may be used in implementing and/or otherwise providing various aspects of the disclosure will first be discussed with respect to FIGS. 1 and 2.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, hand-held or laptop devices, multiprocessor systems, microprocessor-based systems, set top boxes, programmable consumer electronics, network PCs, minicomputers, distributed computing environments that include any of the above systems or devices, and the like.

Figure 2:
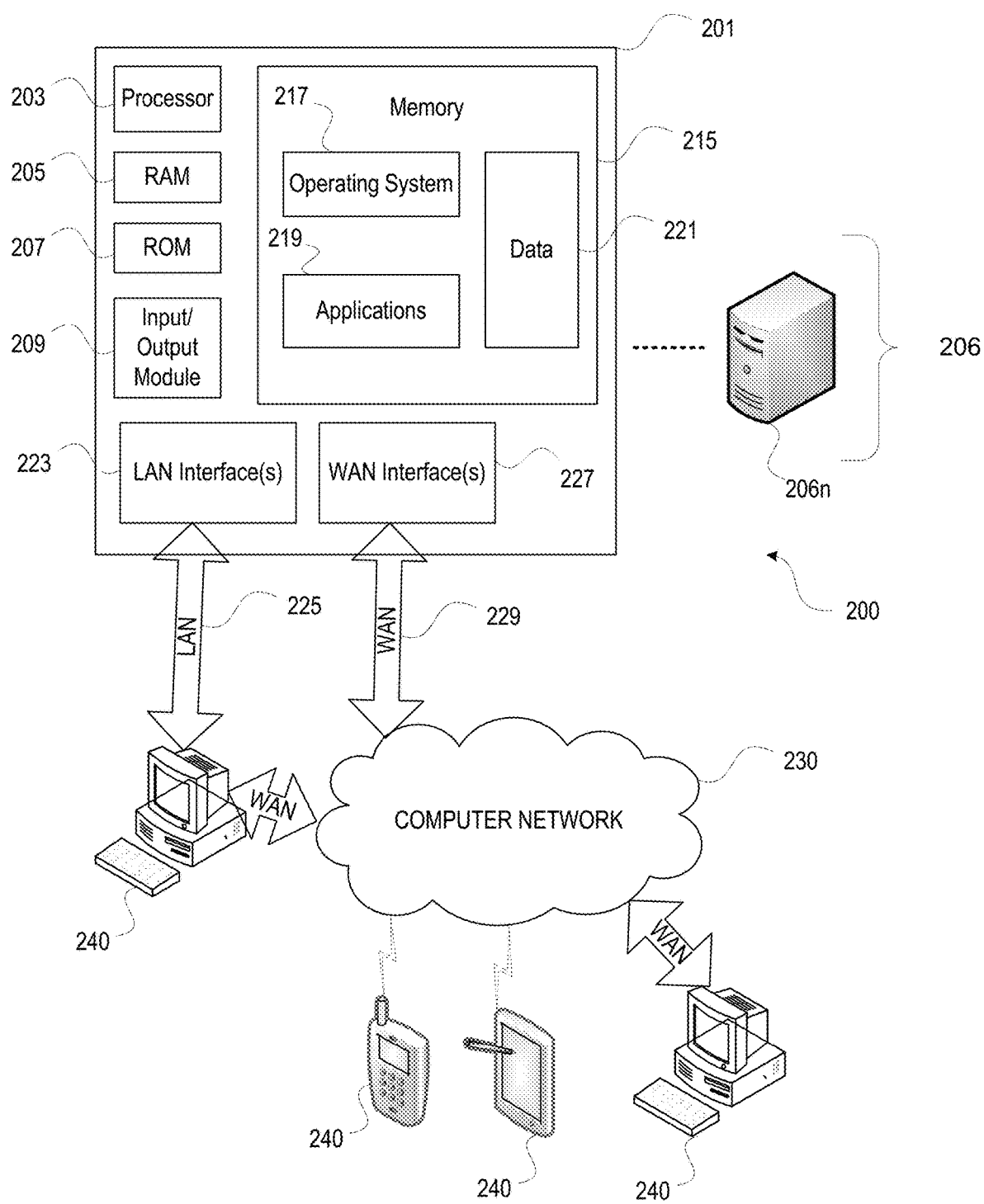
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a peer device 201 in an illustrative computing environment 200 that may be used according to one or more illustrative aspects described herein. In some embodiments, peer device 201 may correspond to computing device 100 (FIG. 1) and/or have similar components. Peer device 201 may be used as a peer 206a in a single-peer or multi-peer environment configured to provide remote access to applications by client devices. Peer device 201 may have a processor 203 for controlling overall operation of the device and its associated components, including RAM 205, ROM 207, I/O module 209, and memory 215, as in computing device 100. Peer device 201 may, in some embodiments, be a personal computer or a desktop computer.

I/O module 209 may include a mouse, keypad, touch screen, scanner, optical reader, and/or stylus (or other input device(s)) through which a local user of peer device 201 may provide input, and may also include one or more of a speaker for providing audio output and a video display device for providing textual, audiovisual, and/or graphical output. Software may be stored within memory 215 and/or other storage to provide instructions to processor 203 for configuring peer device 201 into a special purpose computing device in order to perform various functions as described herein. For example, memory 215 may store software used by peer device 201, such as an operating system 217, application programs 219, and an associated database 221.

Peer device 201 may operate in a networked environment supporting connections to one or more remote computers, such as client devices 240. Client devices 240 may be personal computers, mobile devices, laptop computers, and/or tablets that include many or all of the elements described above with respect to generic computing device 100 (FIG. 1) or peer device 201. In some embodiments, client device 240 may be a mobile device or tablet computer used by the same user as that of peer device 201. The network connections depicted in FIG. 2 include a local area network (LAN) 225 and a wide area network (WAN) 229, but may also include other networks. When used in a LAN networking environment, peer device 201 may be connected to the LAN 225 through a network interface or adapter 223. When used in a WAN networking environment, peer device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Peer device 201 and/or client devices 240 may also be mobile terminals (e.g., mobile phones, smartphones, personal digital assistants (PDAs), notebooks, etc.) including various other components, such as a battery, speaker, and antennas (not shown).

As shown in FIG. 2, one or more client devices 240 may be in communication with one or more peer devices 206a-206n (generally referred to herein as "peer device(s) 206"). The client device(s) 240 may in some embodiments be referred to as a single client device 240 or a single group of client devices 240, while peer device(s) 206 may be referred to as a single peer device 206 or a single group of peer devices 206. In one embodiment a single client device 240 communicates with more than one peer device 206, while in another embodiment a single peer device 206 communicates with more than one client device 240. In yet another embodiment, a single client device 240 communicates with a single peer device 206.

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a peer device 206 or a hypervisor executing on client device 240.

Some embodiments include a client device 240 that displays application output generated by an application remotely executing on a peer device 206 or other remotely located machine. In these embodiments, the client device 240 may execute a virtual machine receiver program or application to display the output in an application window, a browser, or other output window. Applications, as used herein, are programs that execute after an instance of an operating system (and, optionally, also the desktop) has been loaded.

The peer device 201, in some embodiments, uses a remote presentation protocol or other program to send data to a thin-client or remote-display application executing on the client device 240 to present display output generated by an application executing on peer device 201. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

Having discussed several examples of the computing system architecture that may be used in providing and/or implementing various aspects of the disclosure, a number of embodiments will now be discussed in greater detail.

In some embodiments, and according to some aspects discussed herein, a peer device, such a peer device 201, may receive a broadcast request from a client device, such as client device 240, seeking available remote peers. The peer device may respond to the client device indicating that the peer device has available remote access and provide a host address of the peer device. The client device may request a list of available remote applications from the peer device. The peer device may generate the list of available remote applications based on a listing of locally executing application instances and/or a listing of applications installed on the peer device and send the list of available remote applications to the client device. The client device may receive a selection of one of the available executing instances or installed application for remote access and send that selection to the peer device. The peer device may provide the client device with remote access to the selected application, as described further herein with respect to FIG. 3.

Figure 3:
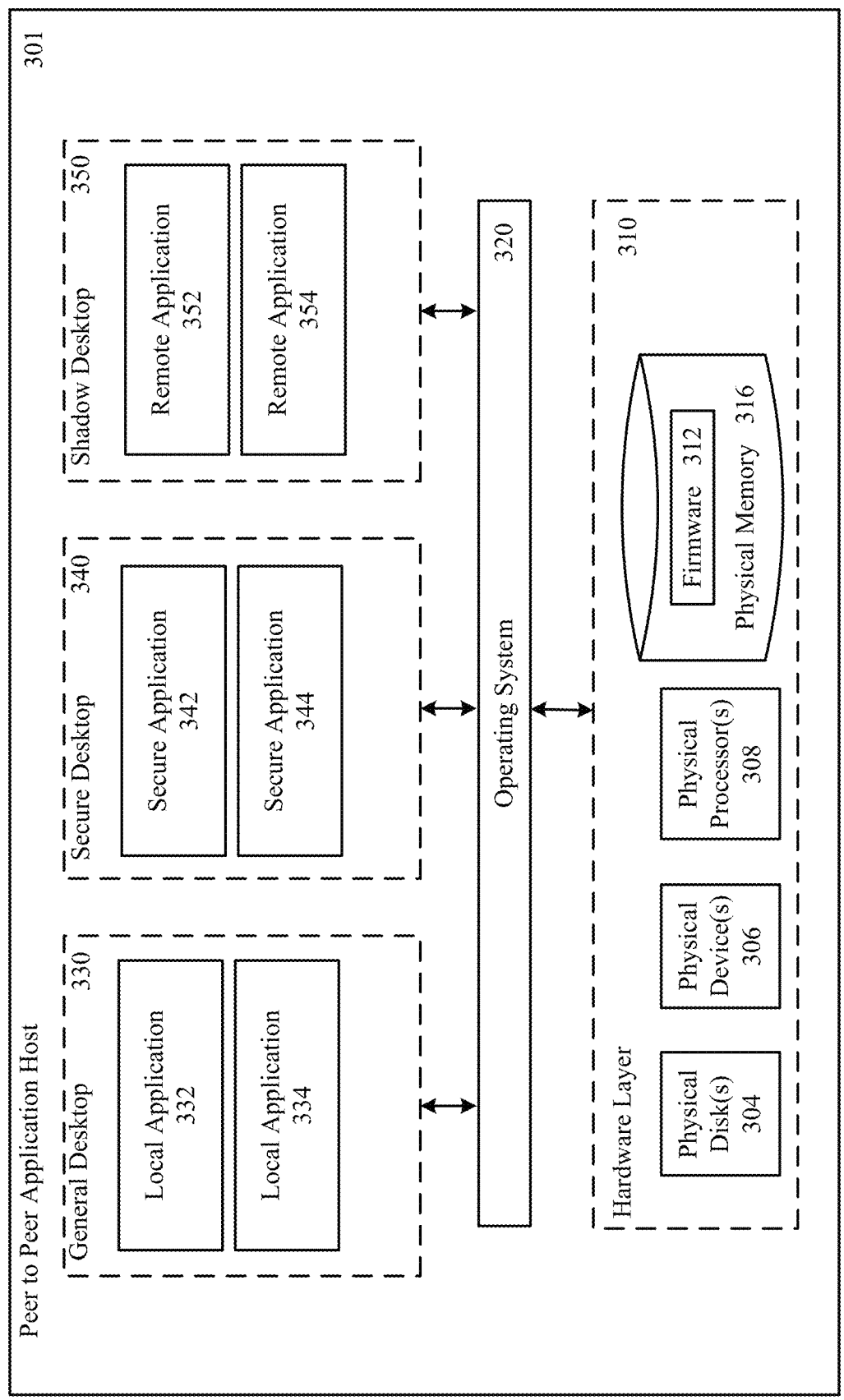
FIG. 3 depicts an illustrative computer system architecture that may be used in accordance with one or more illustrative aspects described herein.

FIG. 3 depicts an illustrative configuration of a computing device, such as computing device 100, as a peer to peer application host 301 (also referred to herein as "peer device 301) for providing one or more client device with remote access to applications installed on and/or executing on host 301. In some embodiments, peer to peer application host 301 may correspond to peer device 201 as illustrated in FIG. 2 and communicate with one or more client devices, such as client device 240, over a network, such as network 230.

Included in peer device 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Peer device 301 may further include an operating system 320 that may be stored in a memory element in the physical memory 316 and executed by one or more of the physical processors 308. Programs or executable instructions stored in the physical memory 316 can be executed by the one or more processors 308 of peer device 301.

Peer device 301 may run an operating system 320, such as WINDOWS, UNIX, LINUX, iOS, ANDROID, SYMBIAN, and the like, which may provide one or more desktops for executing applications. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Peer device 301 may store one or more applications on physical disks 304 and/or physical memory 316. Each of the one or more applications may be installed on peer device 301 and available to local and/or remote users. An application may be executable on physical processor 308, and multiple instances of an application may be executed and run concurrently. Each application and instance of an application may be associated with one or more input and output interfaces, drivers, and/or application programming interfaces (APIs). These interfaces, drivers, and APIs may capture and transmit input and/or output to and from the application or application instance.

Peer device 301 may, through operating system 320, provide one or more desktops for executing applications. For example, general desktop 330 may be provided for local execution of applications by a local user. Output from applications executing in general desktop 330, such as local applications 332 and 334, may be provided to the local user of peer device 301, and input from the local user may be sent to applications executing in general desktop 330 as appropriate. Local applications 332 and 334 may be instances of one or more applications installed on peer device 301. As one example, local application 332 may be an instance of a word processor application installed on peer device 301. Applications executing in general desktop 330 may be executed in a general/unsecured mode and have access to physical disks 304, physical device 306, and/or physical memory 316. Local applications 332 and 334 may communicate with and interact with each other within general desktop 330. Through general desktop 330, a local user of a peer device 301, such as a personal computer or a desktop computer, may operate and interact with applications executing on peer device 301 through input/output interfaces provided by peer device 301. For example, output from local applications 332 and 334 may be provided to a local user through a display by way of an output interface of peer device 301, and input received by an input interface of peer device 301 may be provided to local applications 332 and 334. Applications executing on the general desktop 330 may generate a windowed presentation for output to the local user, and operating system 320 may combine windowed presentations of one or more applications in order to generate a combined presentation of general desktop 330. For example, the windows associated with local applications 332 and 334 may have a z-order associated with them, and the windows may be combined such that one window appears on top of and obscures another based on the z-order.

In some embodiments, peer device 301 may provide one or more secure desktops 340 for executing one or more applications in a secure mode. Although illustrated as one secure desktop, a different secure desktop 340 may be created for each instance of an application executing in a secure mode, such as secure applications 342 and 344. Applications executing in a secure desktop environment, such as secure applications 342 and 344, may be adapted for execution in the secure mode. Applications in secure desktop 340 may be segregated and kept separate from other applications executing on peer device 301, such as applications executing on general desktop 330 or on other secure desktops. In some embodiments, still other desktops may be provided by peer device 301, such as authentication desktops or screen saver desktops, for example.

According to some aspects herein, peer device 301 may facilitate remote access of applications by providing one or more shadow desktops 350 for background execution of remote applications, such as remote applications 352 and 354. Shadow desktop 350 may be a separate desktop environment from general desktop 330, secure desktop 340, and any other desktops provided by operating system 320 and/or peer device 301. Shadow desktop 350 may also be referred to as a background desktop. Instances of applications executing in shadow desktop 350 may be segregated from other applications executing on peer device 301. Applications executing in shadow desktop 350 may be unable to interact with applications executing on other desktop environments. Further, applications executing in shadow desktop 350 may be adapted or otherwise transformed to execute in a remote mode. An instance of an application may be operating in a remote mode where output of the instance is redirected to a remote client and input from the client is transmitted to the first instance. By contrast, an instance executing in a local mode may receive input from a local user of the device and provide output to the local user.

Peer device 301 may execute an instance of an application, such as remote application 352, in a remote mode by hooking into input and output interfaces associated with the application instance. The interfaces may be hooked such that output of the instance is redirected to a client and input from the client is transmitted to the instance. The input and output interfaces may be system and/or application level hooks, drivers, and/or application programming interfaces (APIs) associated with the application and/or application instance. When the application is executed in a remote mode, in some embodiments, output from the application may be suppressed as to the local user and the application might not directly receive input from a local user of peer device 301. By hooking or otherwise modifying input/output interfaces associated with remote application 352, client device 240 may be provided with remote access to remote application 352 hosted on peer device 301. The hooks or modifications may be limited in scope such that they redirect input/output relating to the particular remote application instance but not other instances of that application. Peer device 301, in some embodiments, may use a remote presentation protocol or other program to send data to a thin-client or remote-display application executing on the client device 240 to present display output generated by an application executing on peer device 301. As discussed above, client device 240 may execute a virtual machine receiver program or application to display the output in an application window, a browser, or other output window.

In some embodiments, peer device 301 may operate to provide remote access to a locally executing instance of an application by transforming the instance from a local mode to a remote mode. A first instance of an application, such as local application 334, may be executed on peer device 301 in a general desktop 330. A local user of peer device 301 may view output from and provide input to the locally executing instance, local application 334. For example, local application 334 may be an instance of a word processing application and may display a requested document. It may be determined that peer device 301 should provide remote access to the locally executing instance of the application, such as when a client requests remote access to that instance (discussed further below in regard to FIGS. 4A-B, 5, and 6). Peer device 301 may transform the locally executing instance from the local mode to the remote mode by transferring execution of the instance from the general desktop 330 to a shadow desktop 350 and hooking into input/output interfaces associated with the locally executing instance. For example, the locally executing instance of the word processing application may be initially run in a local mode where it provides output to a local user of peer device 301 and receives input from the local user. Peer device 301 may determine to provide remote access to the instance of the word processor and transform it into a remote mode and transfer execution of the instance to shadow desktop 350. Peer device 301 may hook into or otherwise adapt one or more input interfaces and/or APIs associated with the instance of the word processing application such that the instance will receive input from a remote client device instead of the local user. Peer device 301 may also hook into or otherwise adapt one or more output interfaces and/or APIs associated with the instance such that output from the instance will be sent to the remote client device instead of the local user. Once the locally executing instance of the word processing application has been transformed into the remote mode, a user of the remote device may view the instance and the document that was previously being view by the local user, for example.

In some embodiments, an application instance may be executed in the shadow desktop in a remote mode, yet a local user of the peer device may remotely access the application instance from a remote viewer in the general desktop. That is, peer device 301 may isolate the application instance in shadow desktop 350 and hook one or more input/output interfaces associated with the application instance so that input/output for the application is redirected. However, the local user of peer device 301 may act as the remote client through a remote application viewer executing in general desktop 330. The remote application viewer may serve as the "remote" client for the application instance, and the hooks may operate to redirect input from the local user through the remote viewer to the isolated application instance executing in a remote mode in the shadow desktop.

Having discussed an architecture that may be used to provide remote access to applications and instances of applications hosted by a peer device as shown in FIG. 3, discussion will now turn to a method of discovering remote peers and available applications thereon, as illustrated in FIGS. 4A-B, 5, and 6.

Figure 4A:
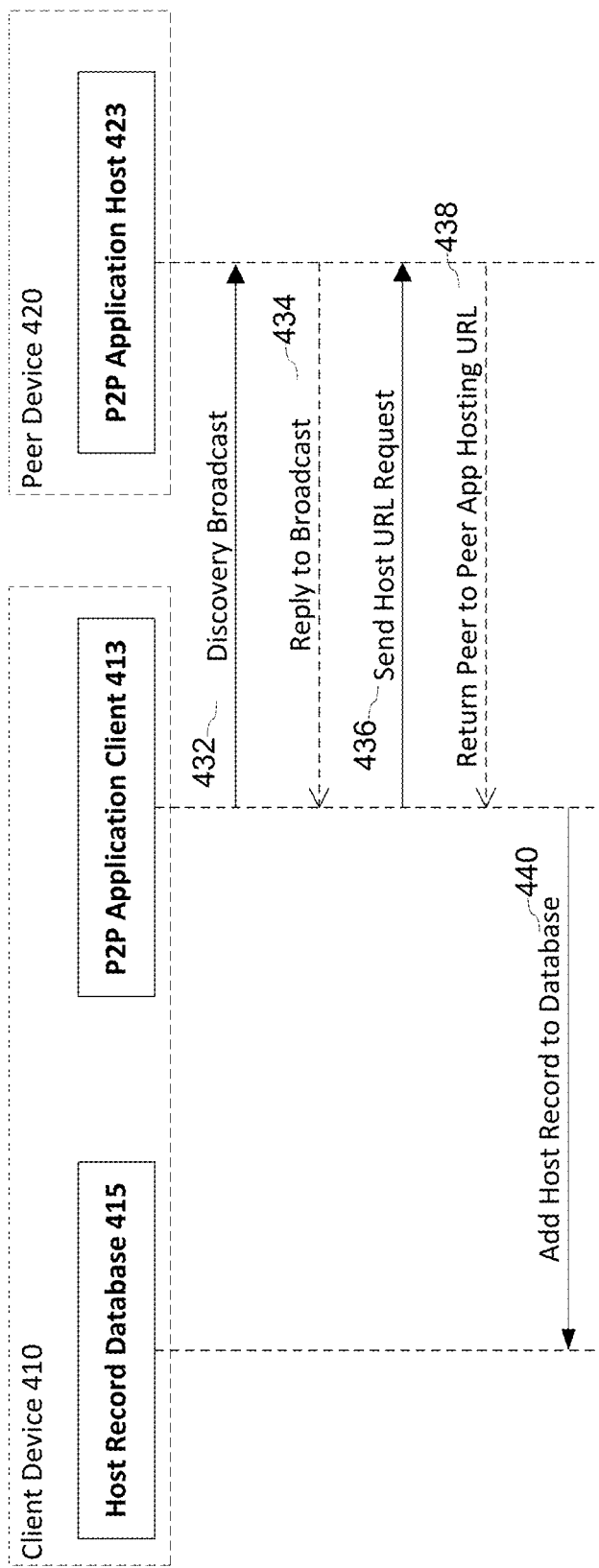
FIGS. 4A-4B depict a process flow diagram in accordance with one of more aspects discussed herein.
Figure 4B:
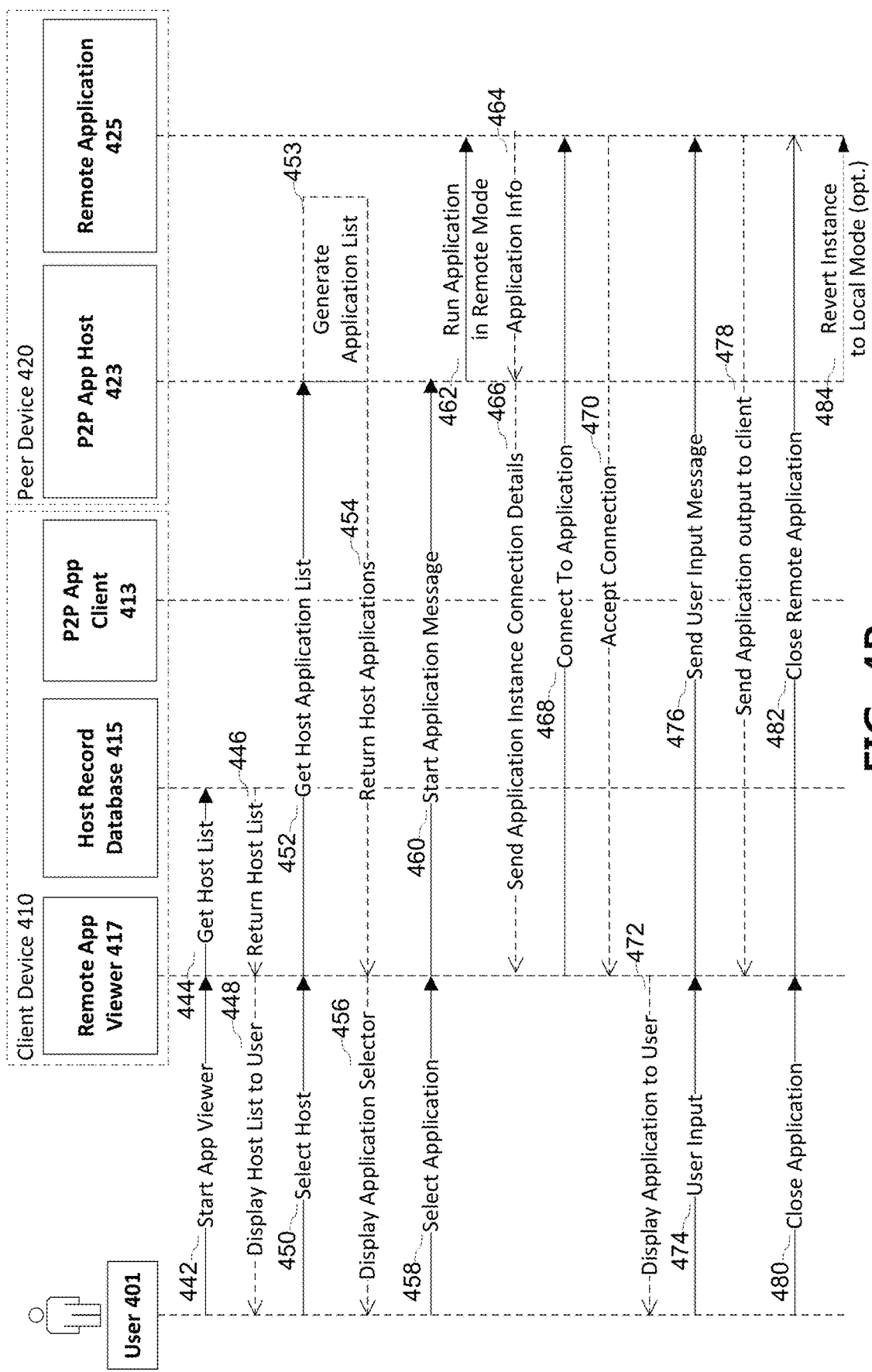

FIGS. 4A and 4B together illustrate a process flow of a method for peer to peer discovery of remote applications, according to some aspects discussed herein. As illustrated in FIGS. 4A and 4B, a client device 410 may communicate with a peer device 420 to discover available applications for remote access. Client device 410 and peer device 420 may together form part of a peer to peer remote application system.

As one specific example of a scenario in which one or more aspects illustrated in FIGS. 4A and 4B may be practiced, client device 410 may be a tablet computer operated by user 401, and peer device 420 may be a desktop computer available to user 401 (FIG. 4B). User 401 may have been previously working on the desktop computer, such as by opening a document in a word processing application on the desktop computer. User 401 may have made changes to the document or located an important piece of information in the document as presented in the instance of the word processing application executing on peer device 420. User 401 may, for example, then proceed to a meeting and take the tablet computer to the meeting. User 401 may operate a remote application viewer 417 installed on the tablet computer to select the desktop computer as a host, select the instance of the word processing application that user 401 previously interacted with, and access that instance remotely using the tablet computer. User 401 may be presented on the tablet computer with the instance of the word processing application as he left it on the desktop computer. A process flow supporting one or more of these features is described in detail below in regard to FIGS. 4A and 4B.

FIG. 4A illustrates a first portion of the process flow where the client device 410 may seek to discover available peer devices, such as peer device 420. Client device 410 may include a peer to peer (P2P) application client 413 for discovering available remote peers. Client device 410 may include host record database 415 for storing information about discovered remote peers. Although P2P application client 413 and host record database 415 are illustrated in FIG. 4A as part of client device 410, in some embodiments they may be implemented separately from and in communication with client device 410. Peer device 420 may include a peer to peer (P2P) application host 423 for responding to discovery requests and providing remote access to applications hosted by peer device 420. P2P application client 413 may be an application installed on client device 410 to enable client device 410 to discover peers and remote access applications hosted by those peers. Similarly, P2P application host 423 may be an application installed on peer device 420 to respond to discovery requests by clients, provide the clients with available applications, and initiate remote access of an application hosted on peer device 420 by a client.

In step 432, P2P application client 413 may send a discovery message over a network seeking available remote peers. In some embodiments, the discovery message may be a broadcast message sent on a network shared by client device 410 and peer device 420. The discovery message may be broadcast on a local area network or wireless network in which client device 410 is a member. In some embodiments, the discovery message may be sent using the Simple Service Discovery Protocol (SSDP) for discovery of network services. In some embodiments, the discovery message may include authentication information and/or access credentials identifying the client device 410 or a user of the client device 410. For example, the discovery message may contain a user name, password, and/or secure key associated with the peer to peer remote application system. The discovery request may be broadcast over the network and received by one or more peers directly, rather than sent to a remote access brokering service. The discovery message may be configured such that peer devices having remote access capability may recognize the request and respond as appropriate. The client device 410 may send the discovery message over the network without knowing the identity of any available peers. As a result, client device 410 need not be pre-configured with knowledge of peer device 420. Instead, client device 410 may dynamically discover peer device 420 by sending the discovery message seeking peers with remote access capability. At step 434, P2P application host 423 may respond to the discovery message, indicating that remote access is available at peer device 420. In some embodiments, the response may be sent as a SSDP message.

At step 436, after receiving the response to the discovery message, P2P application client 413 may request a host URL from P2P application host 423. The host URL may specify an address client device 410 can use to remotely access applications hosted on P2P application host 423. In some embodiments, the request for the host URL may be transmitted as a hypertext transfer protocol (HTTP) request. At step 438, P2P application host 423 may respond to the request by providing a peer to peer application hosting URL for client device 410 to use in accessing remote applications hosted on peer device 420. In other embodiments, P2P application host 423 may provide host access information in addition to or in lieu of the hosting URL, such as an IP address or other information client device 410 may use to access remote applications on peer device 420. At step 440, P2P application client 413 may provide the hosting URL or other information to host record database 415 for inclusion as a host record.

FIG. 4B illustrates a second portion of the process flow where a user 401 may operate client device 410 to select a discovered host, such as peer device 420, view a list of available applications, and select an application to begin remote access. The process flow illustrated in FIG. 4B may occur sequentially to the process flow illustrated in FIG. 4A, or the discovery process illustrated in FIG. 4A may be carried out in advance. In some embodiments, the discovery process illustrated in FIG. 4A may occur during the process illustrated in FIG. 4B, such as after steps 442 or steps 444 where the list of peers is retrieved from the host record database 415. Further illustrated in FIG. 4B, client device 410 may include a remote application viewer 417 and peer device 420 may include one or more remote applications 425. Although client device 410 is illustrated with remote application viewer 417, host record database 415, and P2P application client 413 as separate modules, in other embodiments these may be combined, such as into one module, or they may be implemented in more than one device in communication with one another.

In step 442, user 401 may request that client device 410 begin executing or otherwise initiate remote application viewer 417. Remote application viewer 417 may be installed on client device 410 and may serve as a front end or user interface for P2P application client 413, allowing user 401 to remotely access applications hosted on one or more peer devices, such as peer device 420. Remote application viewer may then, in step 444, request or otherwise retrieve a host list from the host record database 415. The host list may have been dynamically generated according to the steps discussed above in FIG. 4A. In some embodiments, the host list may have been generated prior to remote application viewer 417 starting on client device 410. In other embodiments, the host list may be generated in response to remote application viewer 417 starting or in response to a request for the host list. At step 446, the host record database 415 may return the host list to remote application viewer 417.

At step 448 remote application viewer 417 may present the host list to user 401. Remote application viewer may generate a user interface including the list of available hosts that responded to the discovery process described above in FIG. 4A. The user interface may be presented to user 401 on a display associated with client device 410, and user 401 may select a host including in the list. The host list may include identifying information about the peer devices that responded to the discovery request, such as a name, network identifier, IP address, operating system, description, users, device type, availability, current load, capabilities, any combination thereof, and the like. User 401 may be prompted to select a host to begin remote application access, and in step 450 user 401 may select a host presented by remote application viewer 417.

At step 452, remote application viewer 417 may send a request to the selected host, peer device 420, to get a list of applications available for remote access. The request may be sent using the host URL or other identifier associated with the selected host record and previously retrieved in the steps of FIG. 4A. The request may include authentication data, such as a secure key or password. The request for an application list may be received by peer to peer application host 423 executing on peer device 420.

In step 453, peer device 420 may, through P2P application host 423, generate a list of applications peer device 420 has available for remote access by client device 410. The list of available applications may include one or more applications installed on peer device 420 as well as one or more application instances executing on peer device 420. The list may be generated by P2P application host 423 based on analyzing a listing of applications installed on peer device 420 and a listing of instances of applications executing on peer device 420. Peer device 420 may identify installed applications through mechanisms provided by the operating system, such as an application launcher, start menu, system registry, shortcuts to applications, and the like. Peer to peer application host 423 may analyze the installed applications on peer device 420 to automatically determine which applications are available without requiring a user of peer device 420 to manually identify each application to make available and/or publish. Peer to peer application host 423 may analyze a list of running instances of applications and include those instances in the list returned to client device 410. Peer to peer application host 423 may include locally executing instances of applications in the application list, and more than one instance of a particular application may be included in the application list. As a result, peer to peer application host 423 may respond to client device 410 with a list of applications available for remote access automatically and without a user of peer device 420 having to manually identify particular applications as available remotely.

In step 454, peer to peer application host 423 may return the list of available applications to remote application viewer 417 on client device 410. Remote application viewer 417 may generate an application selector based on the returned list of available applications and application instances, and user 401 may be presented with the application selector in step 456. In step 458, user 401 may select an application or instance included in the application selector to initiate remote access on client device 410. In step 460, remote application viewer 417 may send a message to peer to peer application host 423 requesting remote access to the selected application or instance.

In step 462, P2P application host 423 may start the selected remote application 425. If selected remote application 425 is an instance of an application and is already running on peer device 420, P2P application host 423 may utilize the selected instance and need not start a new instance, in some embodiments. As described above in regard to FIG. 3, the selected application or instance may be executed in a remote mode such that output from the application or instance is redirected to client device 410 and input from client device 410 is transmitted to the application or instance. In some embodiments, an executing application instance may be transformed into the remote mode by way of hooking input and output interfaces, drivers, APIs, and the like associated with the application or instance. The hooks into input and output interfaces may, in some embodiments, be done within the scope of the selected instance of the application. The hooks may be limited to that instance of the application in the remote mode, and other instances of the application may be unaffected and continue to behave normally (that is, receive input from and send output to a local user). In other embodiments, the hooks may be made at an application level.

In some embodiments, the application may be executed in a shadow desktop on peer device 420 or execution of the selected instance may be transferred to the shadow desktop, as discussed above in regard to FIG. 3. The hooks may, in some embodiments, be made at a desktop level within the shadow desktop, such that all input and output interfaces within the shadow desktop are redirected to/from the client device 410. In other embodiments, the executing application may remain on a general desktop of peer device 420 but still be in the remote mode as a result of hooks into one or more interfaces associated with the executing application. Where the application in the remote mode remains on the general desktop, peer device 420 may shift a local display to a screensaver or otherwise obscure display of output from applications executing on peer device 420 and operated by client device 410.

In some embodiments, the application instance may be executed in a remote mode using the methods discussed further below in regard to FIGS. 7, 8, and 9. As will be described further, in some embodiments a host system, such as the peer device, may execute an instance of the application in a remote mode by hooking one or more APIs associated with the application instance and dynamically assigning a network communication port to the application instance. The host system may send an identifier of the port assigned to the instance of the application to a remote client, and the remote client may send user input to the instance of the application by sending the user input to the port. The host system may hook APIs related to user input, and the host system may use the hooked APIs to provide the remote user input to the instance of the application. For example, the host system may provide the remote user input to the application instance by injecting the user input into a user input queue of the application instance. The host system may also provide output from the application instance to the remote client in the form of an application window by hooking one or more APIs associated with a window composition manager. The window composition manager may manage the aggregation, combination, and/or composition of window output from multiple applications executing on the host device and may be provided by an operating system associated with the host device. Using the hooked APIs associated with the application instance, the host system may mark an application window with an identifier, such as a window handle. The identifier may be used by the host system to recognize the application window in data retrieved by the hooked APIs associated with the window composition manager. The marked application window (associated with the application instance) may be extracted and sent to the remote client as output from the application instance. The host system may extract the marked application window and discard window textures other than those corresponding to the application window. These and other aspects of systems and techniques for providing remote access to an application are discussed further below in regard to FIGS. 7, 8, and 9.

Continuing with FIG. 4, in step 464, P2P application host 423 may receive application information from remote application 425. This application information may be used by P2P application host to determine connection details to provide to client device 410 for connecting to the hosted application instance. Peer device 420, in some embodiments, may use a remote presentation protocol or other program to send data to a thin-client or remote-display application executing on the client device 410 to present display output generated by instance of the application hosted on peer device 420. P2P application host 423 may determine application instance connection details based on the application information and send the application instance connection details to remote application viewer 417 in step 466.

Remote application viewer 417 may receive the application instance connection details and may initiate a connection to the hosted remote application instance in step 468. Any suitable protocol for establishing a remote access connection between client device 410 and peer device 420 may be used. For example, the remote access connection may be established according to a remote presentation protocol used by peer device 420. As another example, the remote access connection may be established using the WEBRTC protocol. In step 470, the remote application may accept the remote access connection and begin redirecting output to client device 410 and receiving input from client device 410.

In steps 472-478, user 401 may remotely access and operate the selected application instance hosted on peer device 420. In step 472, remote application viewer 417 may present a user interface or other output from remote application 425 to user 401. In some embodiments, client device 410 may execute a virtual machine receiver program or application to display the output in an application window, a browser, or other output window. In step 474, for example, remote application viewer 417 may receive user input from user 401. For example, user 401 may click, point to, tap, touch, or otherwise select a control included in output from remote application 425 as presented on a display associated with client device 410. In step 476, remote application viewer 417 may send a user input message to remote application 425 using the remote application connection previously established. The user input message may be received by peer device 420 and remote application 425, and the user input may be applied to remote application 425 through hooks in one or more input interfaces and/or APIs. Remote application 425 may respond to the user input and update or otherwise generate output. This output may be captured by hooks in one or more output interfaces and/or APIs, and the output may be sent to remote application viewer 417 in step 478 where it may be presented to user 401 on client device 410. Through this input/output process, user 401 of client device 410 may be able to remotely access and operate a remote instance of an application executing on peer device 420. In some embodiments, the input/output process described through steps 474-478 may be implemented according to one or more aspects of the methods discussed below in regard to FIGS. 8 and 9.

In step 480, user 401 may issue a command to close the remote application. In step 482, remote application viewer 417 may send the command to close the remote application and terminate the remote connection. Remote application 425 may close when the remote access is terminated. Additionally and/or alternatively, in some embodiments remote application 425 may revert to a local mode in optional step 484. For example, where the selected application instance in step 460 is an instance then already executing on peer device 420, the instance may revert back to a local mode once user 401 terminates the remote access. For example, peer device 420 may remove or otherwise terminate the hooks used to redirect the input/output interfaces associated with the application instance. A local user of peer device 420 may then receive output and provide input to the application instance as normal. Thus, according to some embodiments, an application instance may be opened on the peer device and used by a local user, remotely accessed and controlled by a remote user on a client device, and returned to the control of the local user after the remote access terminates.

Figure 5:
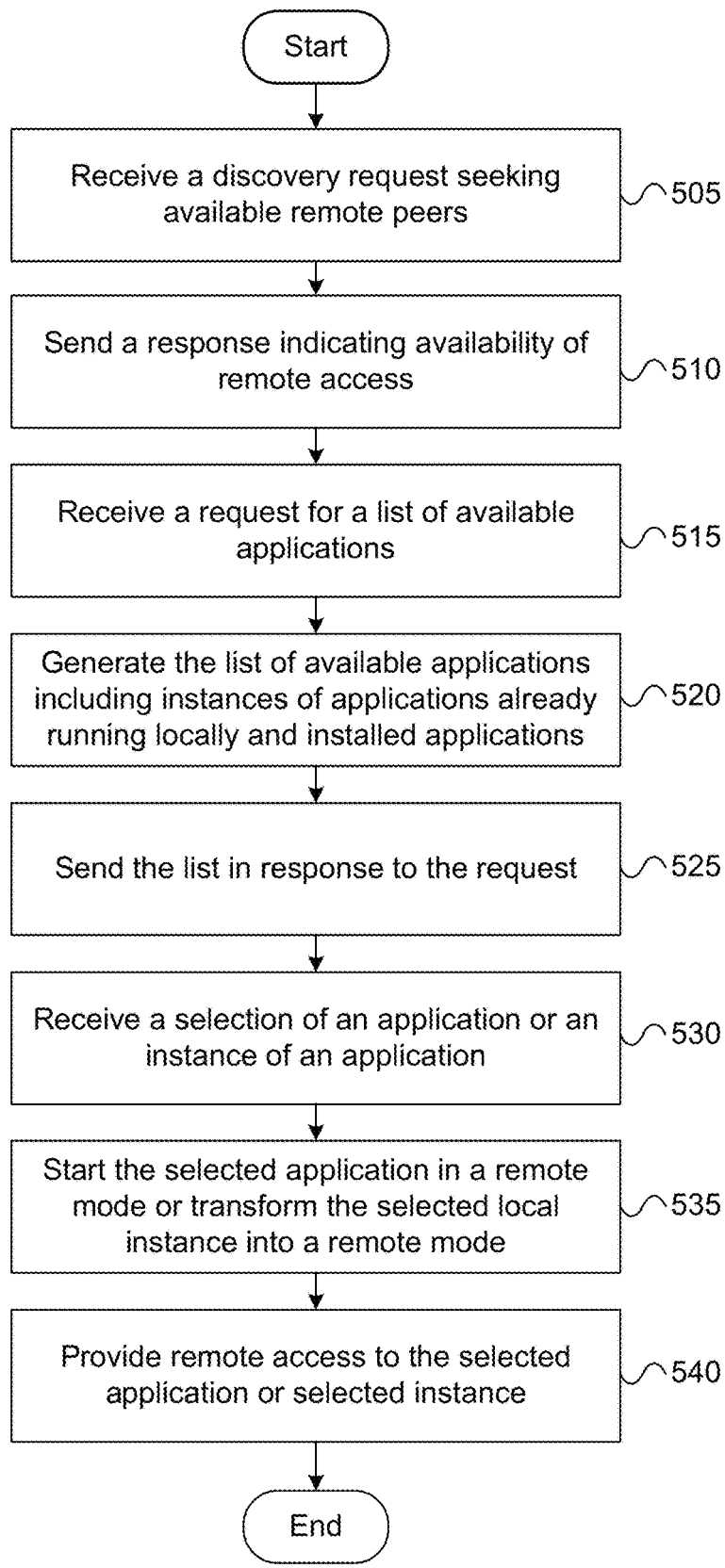
FIG. 5 depicts a flowchart that illustrates a method of peer to peer remote application discovery in accordance with one or more illustrative aspects discussed herein.

Having discussed a process flow of a method for peer to peer discovery of remote applications, discussion will now turn to a method of providing clients with remote access to applications in a peer to peer remote access system, according to some aspects discussed herein and illustrated in FIG. 5.

FIG. 5 illustrates a method of responding to discovery requests for remote peers and providing remote access to a selected application or instance in accordance with one or more illustrative aspects discussed herein. In one or more embodiments, the method illustrated in FIG. 5 and/or one or more steps thereof may be performed by a computing device (e.g., generic computing device 100). Additionally or alternatively, the method illustrated in FIG. 5 and/or one or more steps thereof may, in some instances, be performed by a peer device configured to provide remote access to one or more applications installed thereon. In other embodiments, the method illustrated in FIG. 5 and/or one or more steps thereof may be embodied in computer-executable instructions that are stored in a computer-readable medium, such as a non-transitory computer-readable memory.

In step 505, the peer device may receive a discovery request seeking available remote peers. This discovery request may be broadcast on a network shared by the peer device and a client device that sent the discovery request. The discovery request may contain authentication information or other information about the client device such that the peer device may determine whether to respond indicating that remote access is available.

In step 510, the peer device may send a response indicating the availability of remote access. The response may indicate that the peer device is configured to support the type of remote access requested by the client device. In some embodiments, the peer device may also include an address, URL, or other information usable by the client device to access the peer device for further inquiry. In some embodiments, this additional information may be sent in response to a request from the client device for connection information after the peer device has responded indicating the availability of remote access.

In step 515, the peer device may receive a request for a list of available applications installed on the peer device and application instances executing on the peer device. The request may include authentication information or other information about the client device or the remote access sought.

In step 520, the peer device may generate the list of available applications for remote access. The list may be generated based on a listing of applications installed on the peer device and/or on a listing of application instances already running on the peer device. The list may include one or more installed applications and one or more application instances executing on the peer device. The list may include more than one instance of an application installed on the device, as described above.

In step 525, the peer device may send the list of available applications and application instances to the requesting client device.

In step 530, the peer device may receive a selection of an application or application instance from the client device. For example, the client device may present a user with a user interface including the list of applications and application instances. The user may select one of the applications or application instances, and the client device may communicate this selection to the peer device. Responsive to the user's selection, the client device may communicate with the peer device seeking to establish remote access to the selected application or application instance.

In step 535, the peer device may start the selected application in a remote mode and/or transform the selected application instance into a remote mode. As described above, this may include hooking into one or more input and/or output interfaces associated with the selected application or application instance. In the remote mode, output from the application instance may be redirected to the client device and input from the client device may be transmitted to the application instance. The interface hooks may be of limited scope and apply to the particular instance of the application, rather than the installed application generally. The remote instance of the application may be hooked in such a manner that input/output of that instance is redirected to/from the client device, but other instances of that application continue to send input/output to a local user of the peer device. In some embodiments, the peer device may start the selected application in a remote mode according to one or more aspects of the methods discussed below in regard to FIGS. 8 and 9.

In step 540, the peer device may provide the client device with remote access to the selected application or application instance. The peer device may provide the client device with remote application instance connection information that may be used to initiate a remote access connection with the application instance hosted on the peer device. The peer device may execute one or more remote access protocols to allow the client device to remotely access and/or operate the remote application instance. The client device may use the remote application instance connection information to initiate a remote access connection with the remote application hosted on the peer device. The peer device and/or the remote application instance may accept the remote access connection and provide a user of the client device with remote access until the connection is terminated or remote access otherwise ends.

Figure 6:
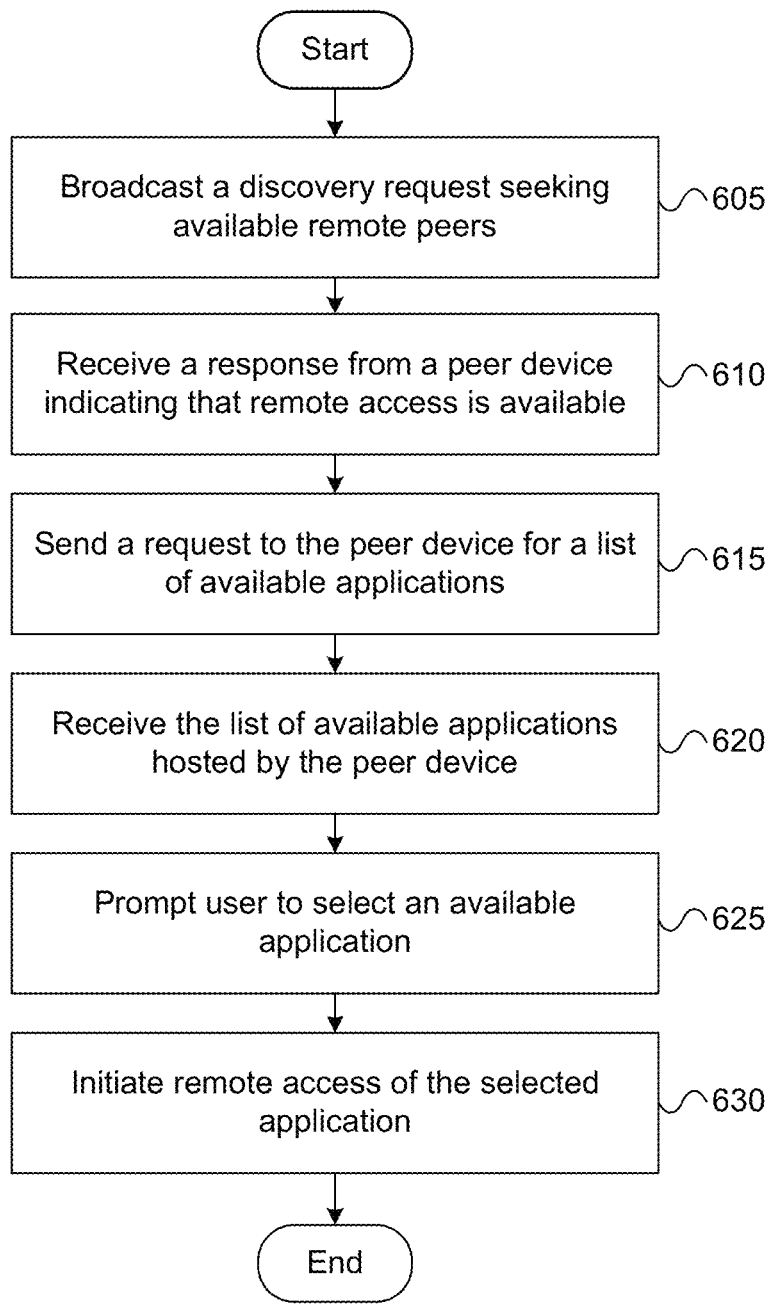
FIG. 6 depicts a flowchart that illustrates another method of peer to peer remote application discovery in accordance with one or more illustrative aspects discussed herein.

Having discussed a method of providing clients with remote access to applications in a peer to peer remote access system, discussion will now turn to a method of discovering peers and requesting remote access to applications in a peer to peer remote access system, according to some aspects discussed herein and illustrated in FIG. 6.

FIG. 6 illustrates a method of discovering available peer devices and requesting remote access to application instances hosted on a peer device, in accordance with one or more illustrative aspects discussed herein. In one or more embodiments, the method illustrated in FIG. 6 and/or one or more steps thereof may be performed by a computing device (e.g., generic computing device 100). Additionally or alternatively, the method illustrated in FIG. 6 and/or one or more steps thereof may, in some instances, be performed by a client device, such as a mobile device or tablet computer, configured to discover remote peers and connect to one or more remote applications. In other embodiments, the method illustrated in FIG. 6 and/or one or more steps thereof may be embodied in computer-executable instructions that are stored in a computer-readable medium, such as a non-transitory computer-readable memory.

In step 605, the client device may send a discovery request on a network seeking available remote peer devices. In some embodiments, as illustrated in FIG. 6, the discovery request may be a broadcast message. The message may be broadcast on a network shared by the client device and a peer device, such as a wireless network or local area network. The message may include authentication information and/or other data regarding permissions or identity of the client device.

In step 610, the client device may receive a response from one or more peer devices indicating that remote access may be available. The response may provide host access information for the peer device, or the client device may send a request to the peer device for the host access information. The client device may store the responses and the associated host access information in a host record database for later use as a host list. The host list may be presented to a user of the client device, and the user may select one of the peer devices in the host list to initiate remote access of that peer device.

In step 615, the client device may send a request to the selected peer device for a list of available applications and application instances. In some embodiments, the request may include authentication information and/or other data about the client device, such as device capabilities, preferences, and the like.

In step 620, the client device may receive the list of available applications hosted by the peer device. The list may include one or more applications installed on the peer device and available for remote access. Additionally and/or alternatively, the list may include one or more application instances executing on the peer device and available for remote access. The list may include information about each available application, such as name, version, capabilities, description, limitations, last access, execution start time, open files, application instance status, user notes, and/or any other suitable information.

In step 625, the client device may generate a user interface presenting the list of applications available for remote access to the user. The user may be prompted to select one of the applications and application instances included in the list. The user interface may include some or all of the information received with the list of applications available for remote access. The client device may analyze the returned list of applications from the peer device and determine a subset of the applications to present to the user. For example, the client device may determine that an application included in the list cannot be properly presented on the client device and may remove that application from the list presented to the user.

In step 630, the client device may initiate remote access of the selected application hosted by the peer device. The client device may transmit an indication of the application or application instance selected by the user to the peer device. The peer device may prepare the selected application or application instance for remote access and provide the client device with application instance remote access information. The client device may use this remote access information to initiate a remote access connection with the selected remote application using one or more protocols for remotely accessing applications. The client device may send input from the user to the remote application by way of a remote access protocol. For example, the client device may send user input to a port associated with the remote application instance, as discussed further below in regard to FIG. 8. The client device may receive output from the remote application and present the output to the user. For example, the client device may receive an application window associated with the remote application instance, as discussed further below in regard to FIG. 9. In some embodiments, the remote application may be presented to the user in a window, browser, and/or desktop provided by the client device. Remote access of the application may continue until the user issues a command to close the remote application or remote access is otherwise terminated.

One or more aspects of the disclosure may allow users to remotely access applications or application instances hosted on a peer device using a client device. By way of the peer to peer remote application discovery techniques discussed herein, a user of the peer device may not need to preconfigure each application that is to be made available remotely, in some embodiments. Additionally, in some embodiments, a locally executing instance of an application on the peer device may be made available to a remote client device dynamically and without a user of the peer device having to manually identify the instance as remotely accessible. For example and as described above, a user who had been working on a document in a word processor at his desktop computer can later access that document as he had been working on it from another device, such as his mobile device. The mobile device may dynamically identify available peer devices, discover the desktop computer, receive a list of remotely available applications including the open instance of the word processor, and initiate remote access of the open instance of the word processor. Thus, according to some aspects disclosed herein, a user may be provided with ready access to his information and applications regardless of physical presence at a device storing that information and executing the applications, potentially providing a better user experience and improving access to information.

Figure 7:
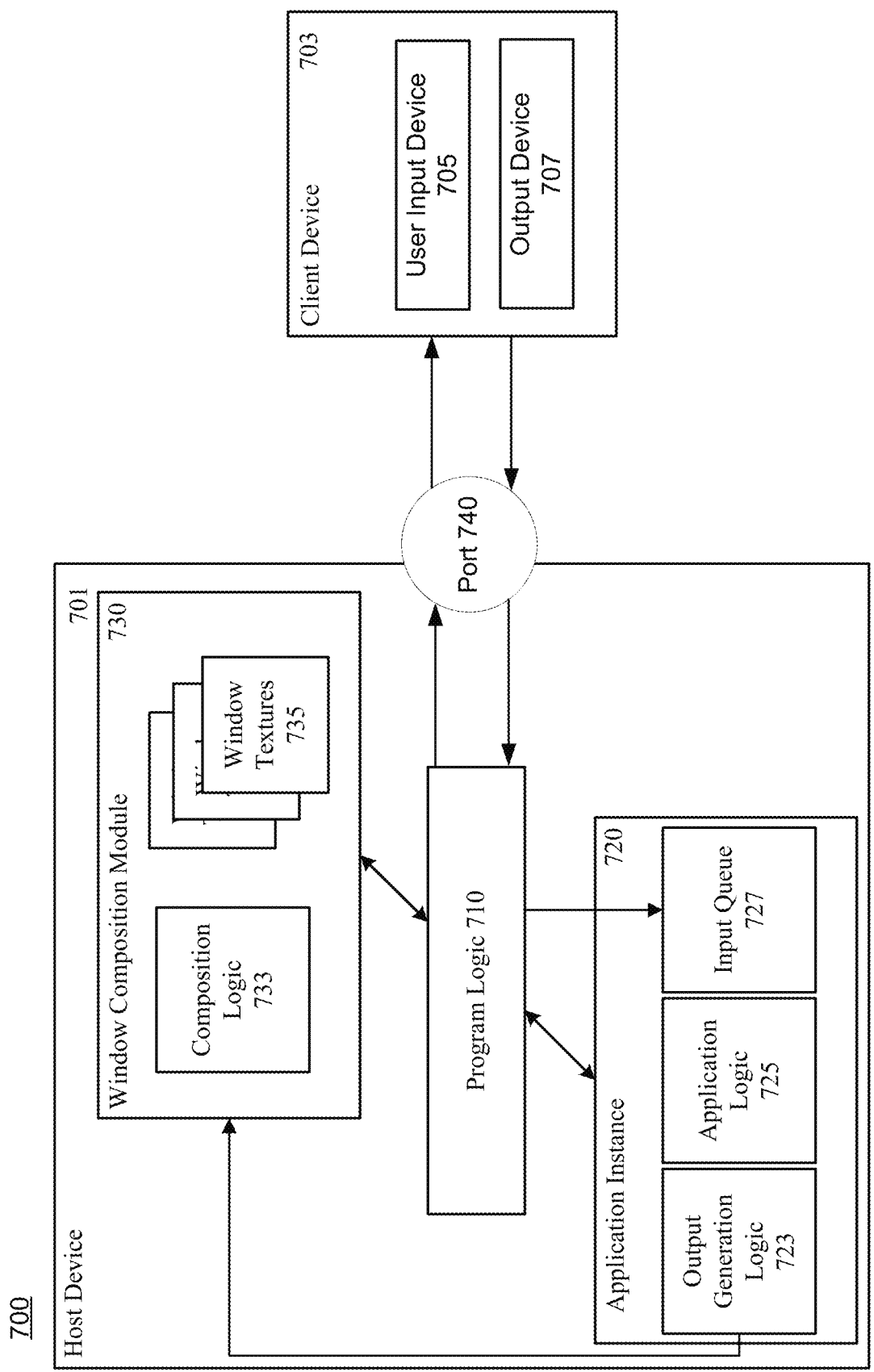
FIG. 7 depicts an illustrative computer system that may be used to provide remote access to an application.
Figure 8:
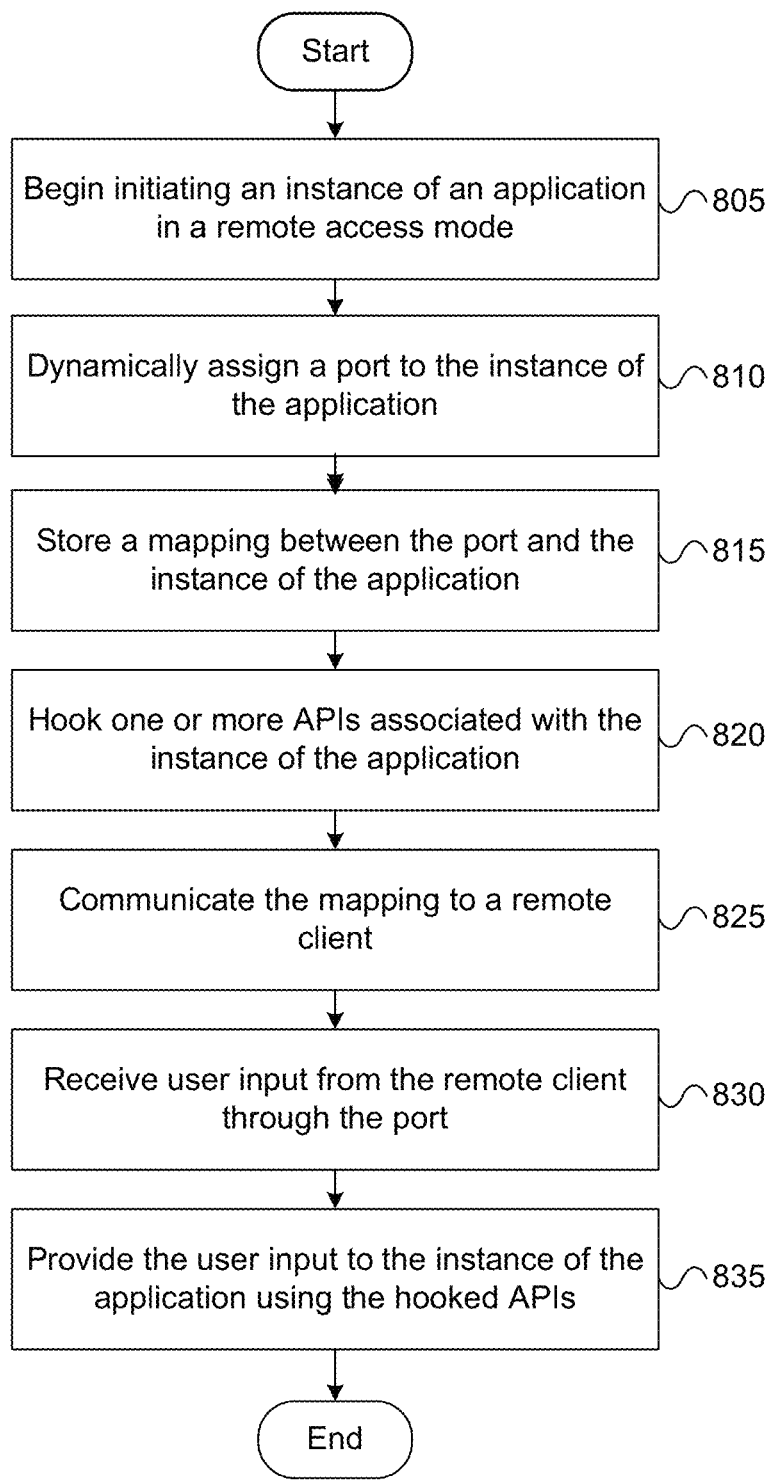
FIG. 8 depicts a flowchart that illustrates a method of providing remote access to an application in accordance with one or more illustrative aspects discussed herein.
Figure 9:
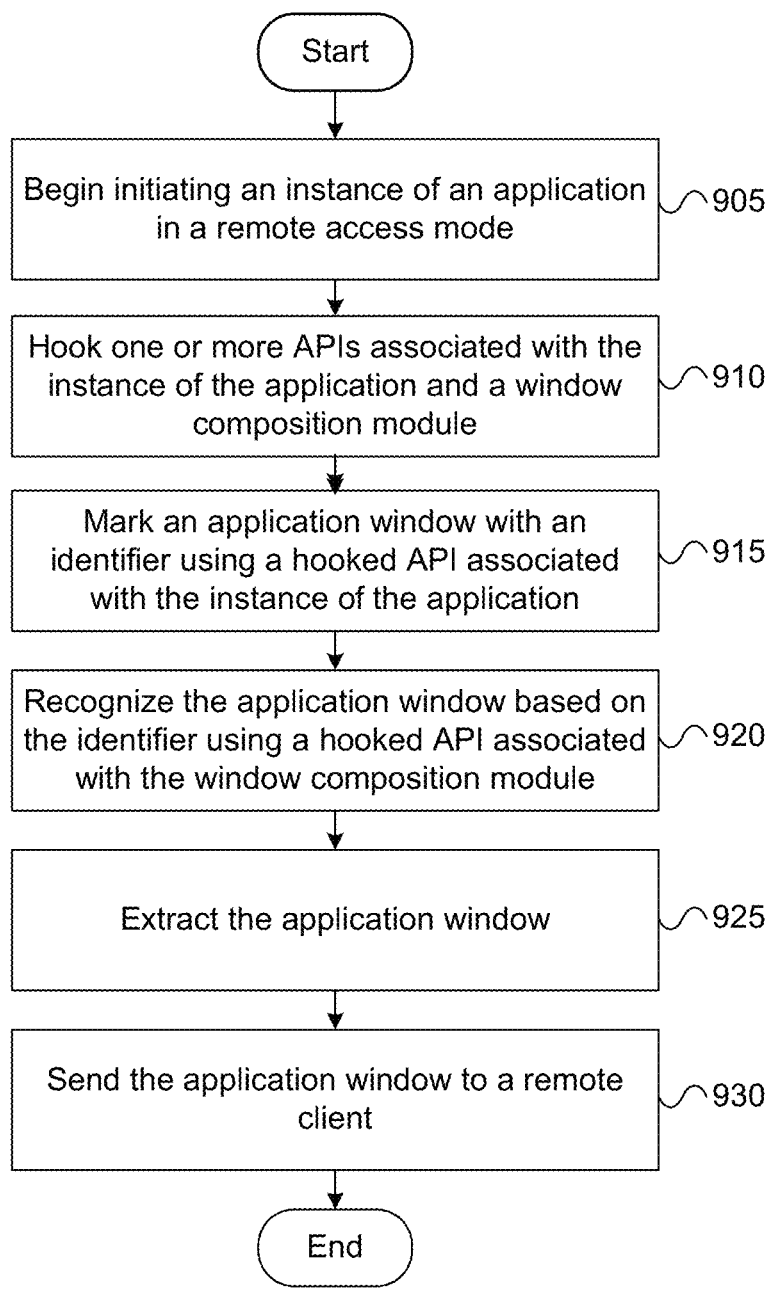
FIG. 9 depicts a flowchart that illustrates another method of providing remote access to an application in accordance with one or more illustrative aspects discussed herein.

Having discussed methods for peer to peer discovery of remote application, as depicted in FIGS. 4, 5, and 6, discussion will now turn to systems and methods for providing remote access to an instance of an application, as depicted in FIGS. 7, 8, and 9. As noted above, the techniques for providing remote access discussed below in regard to FIGS. 7, 8, and 9 may be used to implement one or more aspects of the peer to peer discovery of remote application methods discussed in regard to FIGS. 4, 5, and 6, in some embodiments. For example, the peer device may implement one or more aspects of the techniques depicted in FIGS. 7, 8, and 9. The techniques described below may also be utilized in any suitable setting where it is desirable for a host device to provide client devices with remote access to an instance of an application. For example, the techniques depicted in FIGS. 7, 8, and 9 may be used in an application virtualization environment to provide client devices with remote access to applications hosted on a host device, such as a server.

FIG. 7 depicts illustrative system 700 for providing remote access to an instance of an application. Included in system 700 are host device 701 and remote client device 703. Host device 701 and client device 703 may each be one or more computing devices, such as computing device 100 or computing device 200 and/or may have similar components. Host device 701 may be configured to provide one or more client devices 703 with remote access to applications installed on and/or executing on host device 701. Client device 703 may be remote from host device 701 and the two devices may communicate over a network. In some embodiments, host device 701 may correspond to peer device 201 as illustrated in FIG. 2 and communicate with one or more remote client devices 703, such as client device 240, over a network, such as network 230.

Host device 701 of FIG. 7 may include an operating system that may be stored in physical memory and executed by one or more physical processors, similarly to peer device 301 discussed above in regard to FIG. 3. Host device 701 may run an operating system, such as WINDOWS, UNIX, LINUX, iOS, ANDROID, SYMBIAN, and the like, which may provide one or more desktops for executing applications. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Host device 701 may store one or more applications on physical disks and/or physical memory. Each of the one or more applications may be installed on host device 701 and available to local and/or remote users. An application may be executable on the physical processors, and multiple instances of an application may be executed and run concurrently. Each application and instance of an application may be associated with one or more input and output interfaces, drivers, and/or application programming interfaces (APIs). These interfaces, drivers, and APIs may capture and transmit input and/or output to and from the application or application instance.

Program logic 710 may be stored by host device 701 and executed to implement one or more aspects of the techniques described herein, including the methods depicted in FIGS. 8 and 9. By executing program logic 710, host device 701 may be configured to initiate an instance of an application, such as application instance 720, in a remote mode. By executing application instance 720 in a remote mode, in some embodiments, host device 701 may be configured to provide user input received from remote client device 703 to application instance 720 and to provide output from application instance 720, such as an application window, to client device 703. Host device 701 may utilize a window composition module 730 to combine application windows associated with one or more executing instances of applications on host device 701 into a composite desktop output.

Host device 701 may, in some embodiments, initiate application instance 720 in a remote mode such that user input received by client device 703 may be provided to application instance 720 and output generated by application instance may be provided to client device 703. In some embodiments, host device 701 may initiate application instance 720 in a remote mode in response to a request by client device 703. For example, client device 703 may seek peers offering remote access in a peer to peer remote application discovery system, such as that described above. As another example, client device 703 may be a remote client accessing an application virtualization environment provided by and/or associated with host device 701. Host device 701 may begin initiating application instance 720 in a remote mode by executing the appropriate application stored in memory. For example, host device 701 may create a thread corresponding to application instance 720 when the application is launched. Application instance 720 may include application logic 725, output generation logic 723, and an input queue 727.

Host device 701 may initiate application instance 720 in a remote mode by hooking one or more input and output interfaces associated with application instance 720 and dynamically assigning a network port 740 to application instance 720. Host device 701 may hook APIs related to user input, and the host system may use the hooked APIs to provide remote user input received from client device 703 to application instance 720. Host device 701 may also provide output from application instance 720 to client device 703 in the form of an application window by hooking one or more APIs associated with a window composition manager 730. Window composition manager 730 may manage the aggregation, combination, and/or composition of window output from multiple applications executing on host device 701 and may be provided by an operating system associated with host device 701. Using one or more of the hooked APIs associated with application instance 720, the host system may mark an application window with an identifier, such as a window handle. The identifier may be used by the host system to recognize the application window in data retrieved by the hooked APIs associated with window composition manager 730. Based on the identifier, host device 701 may distinguish between a window texture associated with application instance 720 and a window texture associated with another application. The marked application window (associated with application instance 720) may be extracted and sent to client device 703 as output from application instance 720. The output sent to the client device may include the extracted application window as image data, and may omit window textures associated with other applications.

Host device 701 may hook, intercept, modify, and/or otherwise adapt one or more input interfaces associated with application instance 720 in order to provide remote user input to application instance 720. The input interfaces may be system and/or application level hooks, drivers, and/or application programming interfaces (APIs) associated with the application and/or application instance 720. In some embodiments, host device 701 may hook, intercept, modify, and/or otherwise adapt interfaces such as APIs at a thread level. For example, host device 701 may hook the one or more input interfaces associated with application instance 720 by injecting a dynamic link library (DLL) into a thread corresponding to application instance 720. Such hooks may be of limited scope and apply to the particular instance of the application corresponding to the thread and not other instances of the same application. The hooked APIs may be associated with an input queue 727 of application instance 720. The hooked APIs may, in some embodiments, be used to inject remote user input into input queue 727 and may bypass a general operating system input queue. Through the hooked APIs, host device 701 may provide remote user input to application instance 720.

Host device 701 may dynamically assign a network communication port 740 to application instance 720. Port 740 may be assigned and/or operate in accordance with any appropriate network transport protocol, such as the Transmission Control Protocol (TCP) or the User Datagram Protocol (UDP). Port 740 may be any numbered port, and an existing port may be assigned to application instance 720 if an application corresponding to the existing port is no longer executing. When application instance 720 is initiated in a remote mode, host device 701 may select an available network communication port 740 (or generate a port 740) and create a mapping between port 740 and application instance 720. For example, the mapping may comprise the port assigned for input (port 740), a window handle associated with application instance 720, and a process id associated with application instance 720. The mapping may be used to identify incoming network communications as designated for application instance 720, such as network communications including user input from client device 703. Network communications received by host device 701 on (or designating) port 740 may be processed by host device 701 using program logic 710, and remote user input included in the network communication may be provided to application instance 720. Additionally and/or alternatively, one or more interfaces associated with application instance 720 may be modified to monitor port 740 for available user input. Other network information may also be used to map network communications to a target application instance. For example, an identifier may be assigned to a remotely-accessible application instance and network communications bearing that identifier may be forwarded to the appropriate application instance using the hooked APIs.

Host device 701 may communicate the assigned port 740 to client device 703 by sending the mapping and/or any other identifying information. Client device 703 may use the mapping or other information about the port to send user input commands and/or data to application instance 720. Client device 703 may receive user input from a user input device 705 associated with client device 703, and client device 703 may send this user input to host device 701. User input device 705 may be any suitable user input device, such as a keyboard, pointing device (e.g., mouse, touchpad, touchscreen, etc.), microphone, camera, and the like. Client device 703 may execute a virtual machine receiver program or application to display output associated with application instance 720 in an application window, a browser, or other output window. Client device 703 may distinguish between received user input associated with (remote) application instance 720, such as that received in a remote access viewer (e.g., a virtual machine receiver program), and user input received in other contexts that are not associated with application instance 720. Client device 703 may send user input intended for application instance 720, such as that received in the remote access viewer, to host device 701 in network communications directed to port 740.

Network communications received by host device 701 from client device 703 via port 740 may be processed by program logic 710. Host device 701 may determine, based on the identity of port 740, that received data is intended for application instance 720. Additionally and/or alternatively, a thread associated with application instance 720 may monitor port 740 and process received data on that port. Remote user input data received via port 740 may be provided to application instance 720 using one or more input interfaces associated with application instance 720, such as one or more APIs. As described above, these APIs may be hooked or otherwise modified to inject and/or otherwise provide remote user input to application instance 720. Generally, input in an operating system input queue may be provided to an active application having focus in a given user session having multiple applications executing. If application instance 720 is a background application in the user session (i.e. does not have focus in the user session), then user input placed in the operating system input queue may be directed to the focus application rather than application instance 720. The one or more APIs associated with application instance 720 may be hooked in such a manner as to allow host device 701 to inject the received remote user input into an input queue 727 associated with application instance 720. The received remote user input may bypass the operating system input queue and, in some embodiments, may be directly inserted into input queue 727 associated with application instance 720. Application instance 720 may process input in input queue 727 using, for example, application logic 725. Application instance 720 may generate output, such as an application window, using output generation logic 723. This application window may be provided to a window composition module 730, and image data associated with the application window may be extracted by host device 701 and sent to client device 703, as will be discussed further below.

Output generated by application instance 720 (through output generation logic 723) may be provided to window composition module 730. Host device 701 may execute multiple applications at once, including more than one instance of a single application, and each application may generate visual output corresponding to an application window. This visual output may be provided to window composition module 730 for the generation of a composite desktop output. Window composition module 730 may receive and/or generate window textures 735, which may include image data corresponding to respective application windows provided by applications executing on host device 701. The image data included in window textures 735 may be in a bitmap image format. Through composition logic 733, window composition module 730 may aggregate, combine, and/or compose window textures 735 to create a composite desktop output based on a z-order associated with the corresponding application windows. The composite desktop output may present the application windows in a layered fashion with some application windows occluded by others. An application window associated with an active application may appear on top of other application windows, and the other application windows may be hidden or partially occluded. Due to this occlusion, it may be difficult to extract an image texture corresponding to an application window associated with a background application (e.g., an application other than the focused application) from the composite desktop output generated by the window composition module. Some aspects described herein may overcome this difficulty by marking an application window associated with a remote-accessible application and then recognizing a window texture associated with the remote-accessible application based on the marking and during the window composition process.

Host device 701 may hook, intercept, modify, and/or otherwise adapt one or more output interfaces associated with application instance 720 and interfaces associated with window composition module 730 in order to extract visual output associated with application instance 720, such as a window texture corresponding to an application window associated with application instance 720. The output interfaces associated with application instance 720 may be system and/or application level hooks, drivers, and/or application programming interfaces (APIs) associated with the application and/or application instance 720. In some embodiments, host device 701 may hook, intercept, modify, and/or otherwise adapt interfaces such as APIs at a thread level. For example, host device 701 may hook the one or more input interfaces associated with application instance 720 by injecting a dynamic link library (DLL) into a thread corresponding to application instance 720. Such hooks may be of limited scope and apply to the particular instance of the application corresponding to the thread and not other instances of the same application. The hooked APIs may be associated with output generation logic 723 of application instance 720.

The hooked output interfaces associated with application instance 720 may be used to mark and/or otherwise identify an application window and/or other output generated by output generation logic 723. An application window may be marked with a window handle or other identifier, and host device 701 may utilize this marking to recognize output associated with application instance 720 during processing by window composition module 730. For example, one or more pixels of the application window may be modified and/or adjusted to include the window handle or other identifier. This may be done in such a manner that the visual change to the application window is small, such as where a window handle is encoded in less-significant bits of a pixel value. In some embodiments, the window handle may be encoded or watermarked in a predetermined area, pixel, and/or set of pixels. For example, the window handle may be encoded in a pixel in the middle of the left-most column of the application window.

One or more APIs (or other interfaces) associated with window composition module 730 may be hooked, intercepted, modified, and/or otherwise adapted to recognize a window texture associated with application instance 720 based on the handle or identifier encoded in the application window. In some embodiments, one or more of the APIs associated with window composition module 730 may be hooked and/or adapted through overriding the interfaces by wrapping the APIs (or other interfaces) in derived interfaces that forward calls to the API after hook processing. During the window composition process, window composition module 730 may incrementally process individual window textures 735 as it generates a composite desktop output. Program logic 710 may hook and/or modify one or more APIs associated with window composition module 730 to determine whether an individual window texture 735 was marked with the window handle or other identifier associated with application instance 720. The hooked APIs associated with window composition module 730 may utilize a mapping to identify the window handle or other identifier associated with application instance 720. For example, host device 701 may use the hooked APIs associated with window composition module 730 to determine whether a predetermined pixel or range of pixels in a window texture is encoded with the window handle. If a window texture is not encoded with the window handle (or other identifier) corresponding to application instance 720, processing continues (e.g., window composition module 730 may proceed to a next window texture). If the window texture has the encoded window handle, it may be determined that the window texture corresponds to output of application instance 720, and the window texture may be extracted and sent as image data to client device 703. The extracted image data may include window textures associated with application instance 720, and may omit window textures associated with other applications (i.e., those not recognized as associated with application instance 720). In some embodiments, the window texture data may be in a bitmap format and may be converted to JPEG format as part of the extraction. Client device 703 may receive the window texture associated with application instance 720 and present the window texture to a user by way of output device 707.

As described above, some aspects may hook, intercept, adapt, and/or otherwise modify one or more APIs (or other interfaces) associated with an application instance and/or a windows composition module. The window composition module, in one embodiment, may be a desktop window manager, such as that provided by the Windows 8 operating system provided by the Microsoft Corporation of Redmond, WA The window composition module may be associated with one or more graphics drivers, frameworks, or other visual processing modules. For example, the graphics frameworks may include DirectX, Direct3D, and/or DirectX Graphics Infrastructure (DXGI) provided by the Microsoft Corporation. APIs associated with the application instance, the window composition module, and/or any other related graphics frameworks or modules may be hooked using any suitable technique for modifying the behavior of the API and/or the host device as described herein. For example, in some embodiments an operating system detour-type hook may be used, such as Microsoft detours using in the Windows operating system. These detours may be used to hook graphics drivers or other modules involved in rendering visual information, such as those associated with DirectX or Direct3D provided by Microsoft Corporation. For example, Microsoft detours may be used to hook various graphic framework APIs such as CreateDXGIFactory, CreateDXGI-Factory1, D3D10CreateDevice1, and D3D10CreateDeviceAndSwapChain1. In some embodiments, interface-based hooking may be used where an interface is overridden using a derived object. The host device may store a reference and/or pointer to an original object providing the interface, generate a derived object providing the hook functionality, and cause calls to the derived object to be forwarded to the original object after hook processing. In some embodiments, virtual table hooking may be used to hook interface APIs that may not be documented and belong to a derived private interface of a known public interface. In some embodiments, the hooks may be implemented by injecting a dynamic link library (DLL) into a process, such as by SetWindowsHookEX which injects a DLL into a newly created process or CreateRemoteThread which injects a DLL in an already running process from a system service.

Having discussed a system for providing remote access to an instance of an application, as depicted in FIG. 7, discussion will now turn to a method of providing remote user input to an instance of an application executing on a host device, according to some aspects described herein and illustrated in FIG. 8.

FIG. 8 illustrates a method of providing user input received from a remote client device to an instance of an application executing on a host device, in accordance with one or more illustrative aspects described herein. In one or more embodiments, the method illustrated in FIG. 8 and/or one or more steps thereof may be performed by a computing device (e.g., generic computing device 100). Additionally or alternatively, the method illustrated in FIG. 8 and/or one or more steps thereof may, in some instances, be performed by a host device (such as host device 701 of FIG. 7) configured to provide remote access to one or more applications installed thereon. In other embodiments, the method illustrated in FIG. 8 and/or one or more steps thereof may be embodied in computer-executable instructions that are stored in a computer-readable medium, such as a non-transitory computer-readable memory.

In step 805, a computing device, such as a host device, may begin initiating an instance of an application in a remote access mode. In some embodiments, step 805 may be performed in response to receiving a request from a client to initiate an application and/or application instance in a remote access mode. For example, a client device may issue the request as part of a peer to peer remote application process, such as that depicted in FIG. 5. The host device may start executing an instance of a selected application. In some embodiments, an instance of the application may already be executing and the client may request remote access to the already executing instance, in which case processing proceeds to step 810.

In step 810, the host device dynamically assign a network communication port to the application instance The port may be assigned and/or operate in accordance with any appropriate network transport protocol, such as the Transmission Control Protocol (TCP) or the User Datagram Protocol (UDP). The port may be any suitable port, and the host device may dynamically and/or incrementally generate the ports. When the application instance is initiated in a remote mode, the host device may generate a new network communication port to assign to the application instance. In some embodiments, an existing port may be assigned to the application instance if an application corresponding to the existing port is no longer executing.

In step 815, the host device may create a mapping between the assigned port and the application instance. In some embodiments, the mapping may comprise the port assigned for input, a window handle associated with the application instance, and a process id associated with the application instance. The mapping may be used to identify the application instance as a remote-accessible application. The mapping may indicate that incoming network communications on the assigned port are intended for the application instance, such as network communications including user input from a client device.

In step 820, the host device may hook one or more APIs (or other interfaces) associated with the instance of the application. The hooks may enable the host device to provide remote user input to the application instance. In some embodiments, the host device may hook, intercept, modify, and/or otherwise adapt interfaces such as APIs at a thread level. For example, the host device may hook the one or more input interfaces associated with the application instance by injecting a dynamic link library (DLL) into a thread corresponding to the application instance. Such hooks may be of limited scope and apply to the particular instance of the application corresponding to the thread and not other instances of the same application. The hooked APIs may, in some embodiments, be used to inject remote user input into an input queue associated with the application instance and may bypass a general operating system input queue.

Although illustrated as sequential steps for clarity, steps 805-820 may be performed in any order. Alternatively, steps 805-820 may be combined and/or performed as a single step. That is, the host device may initiate the application instance in a remote access mode by executing an instance of the application, hooking one or more APIs associated with the application instance, dynamically assigning a port to the application instance, and/or storing a mapping of the port and the application instance.

In step 825, the host device may communicate the mapping and/or other information associating the port and the application instance to a client device. The host device may communicate a portion of the mapping information stored by the host device. For example, the host device may send the client device a port associated with a requested application instance, but may keep internal data such as window handles and process ids secret from the client device. The client device may utilize the mapping information to send user input to the application instance operating in the remote access mode. A user of the client device may provide user input using any suitable user input device, such as a keyboard, pointing device (e.g., mouse, touchpad, touchscreen, etc.), microphone, camera, and the like. The client device may execute a virtual machine receiver program or application to display output associated with the application instance in an application window, a browser, or other output window. The client device may distinguish between received user input associated with the (remote) application instance, such as that received in a remote access viewer (e.g., a virtual machine receiver program), and user input received in other contexts that are not associated with the application instance. The client device may send user input intended for the remote application instance, such as that received in the remote access viewer, to the host device in network communications directed to the port provided by the host device.

In step 830, the host device may receive network communications from the client device via the port assigned to the application instance. The host device may determine, based on the identity of the port that received the data, that the received data is intended for the application instance operating in the remote access mode. For example, a thread associated with the application instance may monitor the port assigned to the application instance and process data received on that port, based on the hooks and/or modifications made during step 820.

In step 835, remote user input data received via the port may be provided to the application instance using one or more of the hooked APIs (or other interfaces) associated with the application instance. As described above, these APIs may be hooked or otherwise modified to inject and/or otherwise provide remote user input to the application instance. The one or more APIs associated with the application instance may be hooked in such a manner as to allow the host device to inject the received remote user input into an input queue associated with the application instance, bypassing an operating system input queue of a user session. The user session may have more than one application, and the remote-accessible application instance may be a background application within the user session. The application instance may process input in the input queue associated with the application instance, and the application instance may generate output that may be provided to the client device. For example, the application instance may generate an application window. The host device may identify the application window, extract image data associated with the application window, and forward the image data to the client device.

In some embodiments, a host device may implement steps 805-820 and other steps by hooking particular interfaces and messages associated with the application instance. For example, the host device may inject a module such as a DLL into a process associated with the application instance. Data may be shared between the host device and the client device using a virtual input data mapping which may identify a process id, top window handle, and assigned port corresponding to the application instance operating in the remote access mode. This data may be maintained in a shared portion of the DLL, and the application instance may be able to access the virtual input data mapping through the DLL. A thread may be spawned from a load section of the DLL when the DLL is injected in to the application instance, and the thread may wait for the virtual input data mapping to be set by the server. Once the mapping is set, the DLL may begin monitoring the assigned port to receive user input from a remote client device. The DLL may create a TCP/UDP socket on the assigned port in order to receive the data. A service thread may be spawned to handle received input data, and the service thread may push the received input data into an application instance specific input queue. The host device may hook direct input interfaces associated with the application instance during initialization, and in some embodiments when the application instance queries a DINPUT interface for input data it may receive the remote user input from the input queue associated with the application instance. In some embodiments, some of the PAIS hooked may include raw input APIs, DINPUT interfaces, Windows Process, GetMessageA, GetMessageW, GetRawInputData, GetKeyState, GetKeyboardState, and the like. A hook into a get message APIs may wait for remote user input and may forward remote messages to the application instance while discarding local messages. When the user exits the application instance operating in the remote mode, the host device may execute a cleanup operation to remove and/or undo hooks created by the host device, such as by restoring original interface handling objects.

Having discussed a method of providing remote user input to an instance of an application executing on a host device, as illustrated in FIG. 8, discussion will now turn to a method of providing output from an instance of an application operating in a remote mode to a client device, according to some aspects described herein and illustrated in FIG. 9.

FIG. 9 illustrates a method of providing output associated with an instance of an application operating in a remote mode on a host device to a client device, in accordance with one or more illustrative aspects described herein. In one or more embodiments, the method illustrated in FIG. 9 and/or one or more steps thereof may be performed by a computing device (e.g., generic computing device 100). Additionally or alternatively, the method illustrated in FIG. 9 and/or one or more steps thereof may, in some instances, be performed by a host device (such as host device 701 of FIG. 7) configured to provide remote access to one or more applications installed thereon. In other embodiments, the method illustrated in FIG. 9 and/or one or more steps thereof may be embodied in computer-executable instructions that are stored in a computer-readable medium, such as a non-transitory computer-readable memory.

In step 905, a computing device, such as a host device, may begin initiating an instance of an application in a remote access mode. In some embodiments, step 905 may be performed in response to receiving a request from a client to initiate an application and/or application instance in a remote access mode. For example, a client device may issue the request as part of a peer to peer remote application process, such as that depicted in FIG. 5. The host device may start executing an instance of a selected application. In some embodiments, an instance of the application may already be executing and the client may request remote access to the already executing instance, in which case processing proceeds to step 910.

In step 910, the host device may hook, intercept, modify, and/or otherwise adapt one or more output APIs (or other interfaces) associated with the application instance and one or more composition APIs (or other interfaces) associated with a window composition module. These APIs may be hooked in order to extract visual output associated with the application instance, such as a window texture corresponding to an application window associated with the application instance.

The output APIs (or other interfaces) associated with the application instance may be hooked, intercepted, modified, and/or otherwise adapted to mark an application window with an identifier of the application instance. The output interfaces may include system and/or application level hooks, drivers, and/or application programming interfaces (APIs) associated with the application and/or application instance. In some embodiments, the host device may hook, intercept, modify, and/or otherwise adapt interfaces such as APIs at a thread level. For example, the host device may hook the one or more input interfaces associated with the application instance by injecting a dynamic link library (DLL) into a thread corresponding to the application instance. Such hooks may be of limited scope and apply to the particular instance of the application corresponding to the thread and not other instances of the same application.

The composition APIs (or other interfaces) associated with the window composition module may be hooked, intercepted, modified, and/or otherwise adapted to recognize a window texture as associated with the application instance based on the handle or identifier encoded in the application window. In some embodiments, one or more of the APIs associated with the window composition module may be hooked and/or adapted through overriding the interfaces by wrapping the APIs (or other interfaces) in derived interfaces that forward calls to the API after hook processing.

In step 915, the host device may use the hooked output interfaces associated with the application instance to mark and/or otherwise identify an application window and/or other output generated by output generation logic of the application instance. An application window may be marked with a window handle or other identifier, and the host device may utilize this marking to recognize output associated with the application instance during processing by window composition module (in step 920, below). For example, one or more pixels of the application window may be modified and/or adjusted to include the window handle or other identifier. This may be done in such a manner that the visual change to the application window is small, such as where a window handle is encoded in less-significant bits of a pixel value. In some embodiments, the window handle may be encoded or watermarked in a predetermined area, pixel, and/or set of pixels. For example, the window handle may be encoded in a pixel in the middle of the left-most column of the application window. Other identifiers may be encoded in the application window for recognition by the host device, such as a process id or any other suitable information stored in a mapping associating the application instance with the identifier.

In step 920, the host device may use the hooked composition interfaces associated with the window composition module to analyze individual window textures during incremental texture processing by the window composition module. The host device may use the hooked composition interfaces to determine whether an individual window texture was marked with the window handle or other identifier associated with the application instance. The hooked APIs associated with the window composition module may utilize a mapping to identify the window handle or other identifier associated with the application instance operating in the remote mode. For example, the host device may use the hooked APIs associated with the window composition module to determine whether a predetermined pixel or range of pixels in a window texture is encoded with the window handle. If a window texture is not encoded with the window handle (or other identifier) corresponding to the application instance, processing continues (e.g., the window composition module may proceed to a next window texture). If the window texture has the encoded window handle, it may be determined that the window texture corresponds to output of the application instance in the remote access mode.

In step 925, the host device may extract the window texture recognized as corresponding to the application instance. The window texture may be extracted as image data, and in some embodiments the image data may be in a bitmap format. The image data may be converted to another suitable format, such as JPEG. In step 930, the recognized window texture may be sent to the client device. The client device may receive the window texture associated with the application instance and present the window texture to a user by way of an output device.

In some embodiments, a host device may implement step 910 and other steps by wrapping actual interfaces associated with Direct3D and DirectX Graphics Infrastructure (DXGI) into a derived interface. Using a QueryInterface call on a DXGIFactory object obtained through the DXGI interfaces, the host device may identify an actual DXGIFactoryDWM interface associated with a window composition module. Using virtual table hooking, the host device may modify and/or adapt a Present function associated with DXGIFactoryDWM. The Present function may be called after frame composition by the window composition module to render the composite desktop output. Using DLL injection methods, such as through SetWindowsHookEX or CreateRemoteThread, the host device may hook into each of the application instance, a windows process associated with the application instance, a shell process and message handler, and identify a top window for the windows process associated with the application instance. Using the hooks, the host device may watermark/mark a particular pixel with the window handle to the top window in response to a window create, resize, focus change, and/or paint message on the application window. The particular pixel may be located on a left or right edge of the application window, and may be located in a center position vertically. In some embodiments, this may avoid having the application draw over the marked pixel. In the window composition module, the interface hooks may be used to watch for embedded windows handles in each texture during a texture composition process. Textures may be added to a pixel shader resource prior to rendering, and the host device may read pixels from the texture and match embedded windows handles to a mapping of remote-accessible applications using the hooked interfaces associated with the window composition module. For example, the window composition module, such as the desktop window manager of Windows 8, may call a shader resource using a function such as OpenShaderResource when application visibility changes and a PSSetShaderResources function during composition of each individual window texture on a D3D10Device1 interface. Through this process, an individual pixel of the window texture may be read and the window texture may be recognized as associated with the application instance.

In some embodiments, the techniques described above in regard to FIGS. 8 and 9 may be combined to provide remote access to applications executing in a user session by dynamically assigning ports to application instances in a remote access mode and hooking one or more APIs (or other interfaces) associated with the application instance and a window composition module. The techniques described above in regard to FIG. 8 may be used to provide remote user input to an application instance operating in a remote access mode. Dynamically assigned ports may be generated and used to allow a client device to provide remote user input to an application instance operating in a remote access mode. One or more APIs associated with the application instance may be hooked to provide the remote user input to an input queue of the application instance, bypassing an operating system input queue in some embodiments. The techniques described above in regard to FIG. 9 may be used to provide output from the application instance to the remote client device. APIs associated with the application instance and the window composition module may be hooked to allow the host device to recognize window textures generated by the application instance. These recognized window textures may be sent to the remote client device. For example, the host device may initiate an instance of an application in a remote access mode by assigning a port to the application instance, hooking one or more input interfaces associated with the application instance, hooking one or more output interfaces associated with the application instance, hooking one or more composition interfaces associated with a window composition module, and storing a mapping between the application instance and the assigned port. The host device may provide remote user input received via the port to the application instance using the hooked input APIs, and the host device may provide output from the application instance to a remote client device using the hooked output and composition APIs, as described above in regard to FIGS. 8 and 9. As a result, according to some aspects, a host device may enable remote access to the application instance by providing remote input to the application instance and forwarding output from the application instance to the remote client device.

One or more aspects of the disclosure may allow users to remotely access applications or application instances hosted on a host device using a client device. By way of the remote access techniques discussed herein, user input can be handled on a per-application basis rather than on a user-session basis. Through dynamically assigned ports and hooks into APIs associated with an application instance, in some embodiments, a host device may inject remote user input into an input queue of a remotely-accessible application and bypass an operating system input queue. By marking an application window with an identifier and then recognizing that identifier during window composition processing, in some embodiments, a host device may extract an unoccluded application window even where the remote-accessible application instance is operating in a background of a user session and may be occluded by foreground windows. As a result, according to some aspects disclosed herein, multiple remote users can be supported within a single user session on a host device, and the session may host multiple applications and instances of applications.

As illustrated above, various aspects of the disclosure relate to peer to peer discovery of remote applications, particularly through identifying peer devices in a network by way of discovery requests. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
initiating, by a peer device, an instance of an application hosted on the peer device in a remote mode, the remote mode configured to execute the application in another desktop and redirect output from the application to a client device and enable the application to receive input from the client device;
transferring, in response to the initiation of the remote mode, execution of the instance of the application from a general desktop environment of the peer device to another desktop environment of the peer device, wherein the another desktop environment is segregated from other desktops of the peer device;
suppressing input and output associated with the instance of the application executing in the another desktop environment from and to a local user of the peer device; and
providing, by the peer device, the client device with remote access to the instance of the application with use of the another desktop.

2. The method of claim 1, wherein providing the client device with remote access to the instance of the application with use of the another desktop is performed such that input and output of the instance of the application are redirected to the client device instead of the peer device, wherein input and output associated with other instances of the application are not redirected to the client device.

3. The method of claim 1, further comprising:
transmitting a broadcast message on a local area network shared by the peer device and the client device, wherein the broadcast message comprises an indication of the instance of the application hosted on the peer device.

4. The method of claim 1, further comprising:
receiving, from the client device, a second request for a list of one or more applications currently executing on the peer device; and
generating the list of the one or more applications currently executing on the peer device, wherein the list comprises the instance of the application, and wherein receiving the request is in response to a user selection of the instance of the application from the list.

5. The method of claim 1, further comprising:
broadcasting a list of one or more applications currently executing on the peer device to a plurality of client devices that includes the client device.

6. The method of claim 1, wherein transferring the execution of the instance of the application comprises:
executing the application in the another desktop environment.

7. The method of claim 1, wherein the instance of the application is executing on the peer device before the application is initiated in the remote mode.

8. The method of claim 1, further comprising:
hooking into input and output interfaces associated with the instance of the application such that output of the application is redirected to the client device and input from the client device is transmitted to the application.

9. The method of claim 1, further comprising:
determining that remote access to the instance of the application is terminated; and
transferring the instance of the application back to a local mode.

10. The method of claim 1, wherein the local user accesses the instance of the application executing in the another desktop environment as a remote client through a remote application viewer executing on the general desktop environment.

11. A method comprising:
receiving, by a client device, a list of one or more applications hosted in a general desktop environment of a peer device, wherein the list of the one or more applications hosted in the general desktop environment of the peer device includes a first instance of a first application executing in the general desktop environment, and the general desktop environment configured to enable the first instance to receive, via an input device of the peer device, user input from a local user and provide output, via an output device of the peer device, to the local user;
initiating, responsive to a selection of the first instance, remote access to the first instance of the first application by transferring the first instance from the general desktop environment to a background desktop environment of the peer device segregated from the general desktop environment, wherein, the background desktop environment redirects input and output of the first instance to the client device, and wherein input and output associated with other instances of the application in the general desktop environment are provided via the peer device; and
suppressing input and output associated with the instance of the application executing in the background desktop environment from and to the local user.

12. The method of claim 11, further comprising:
presenting, on a user interface of the client device, the list of the one or more applications, wherein the list of the one or more applications includes the first instance of the first application and one or more applications that are currently executing in the general desktop environment.

13. The method of claim 11, further comprising:
hooking into input and output interfaces associated with the first instance of the first application such that output of the first instance of the first application is redirected to the client device and input from the client device is transmitted to the first instance of the first application.

14. The method of claim 11, wherein the peer device is a first peer device, the method further comprising:
broadcasting, by the client device, a discovery request seeking available remote peers, wherein the discovery request comprises a user credential;
receiving, by the client device and based on verification of the user credential, a response from a plurality of peer devices indicating that remote access is available, wherein the plurality of peer devices comprises the first peer device; and
sending, by the client device and to the first peer device, a request for the list.

15. A computing device comprising:
one or more processors; and
memory storing instructions that, when executed by the one or more processors, cause the computing device to:
initiate an instance of an application hosted on the computing device in a remote mode, the remote mode configured to execute the application in another desktop and redirect output from the application to a client device and enable the application to receive input from the client device;
transfer, in response to the initiation of the remote mode, execution of the instance of the application from a general desktop environment of the computing device to another desktop environment of the computing device, wherein the another desktop environment is segregated from other desktops of the computing device;

suppressing input and output associated with the instance of the application executing in the another desktop from and to a local user of the computing device; and provide the client device with remote access to the instance of the application with use of the another desktop.

16. The computing device of claim 15, wherein the instructions, when executed by the one or more processors, cause the computing device to provide the client device with remote access to the instance of the application with use of the another desktop such that input and output of the instance of the application are redirected to the client device instead of the computing device, wherein input and output associated with other instances of the application are not redirected to the client device.

17. The computing device of claim 15, wherein the instructions, when executed by the one or more processors, further cause the computing device to:

transmit a broadcast message on a local area network shared by the computing device and the client device, wherein the broadcast message comprises an indication of the instance of the application hosted on the computing device.

18. The computing device of claim 15, wherein the instructions, when executed by the one or more processors, further cause the computing device to:

receive, from the client device, a second request for a list of one or more applications currently executing on the computing device; and generate the list of the one or more applications currently executing on the computing device, wherein the list comprises the instance of the application, and wherein receiving the request is in response to a user selection of the instance of the application from the list.

19. The computing device of claim 15, wherein the instructions, when executed by the one or more processors, further cause the computing device to:

broadcast a list of one or more applications currently executing on the computing device to a plurality of client devices that includes the client device.

20. The computing device of claim 15, wherein the instructions, when executed by the one or more processors, further cause the computing device to:

hook into input and output interfaces associated with the instance of the application such that output of the application is redirected to the client device and input from the client device is transmitted to the application.

21. The computing device of claim 15, wherein the instructions, when executed by the one or more processors, further cause the computing device to:

determine that remote access to the instance of the application is terminated; and transfer the instance of the application back to a local mode.

* * * * *